Figure 1:
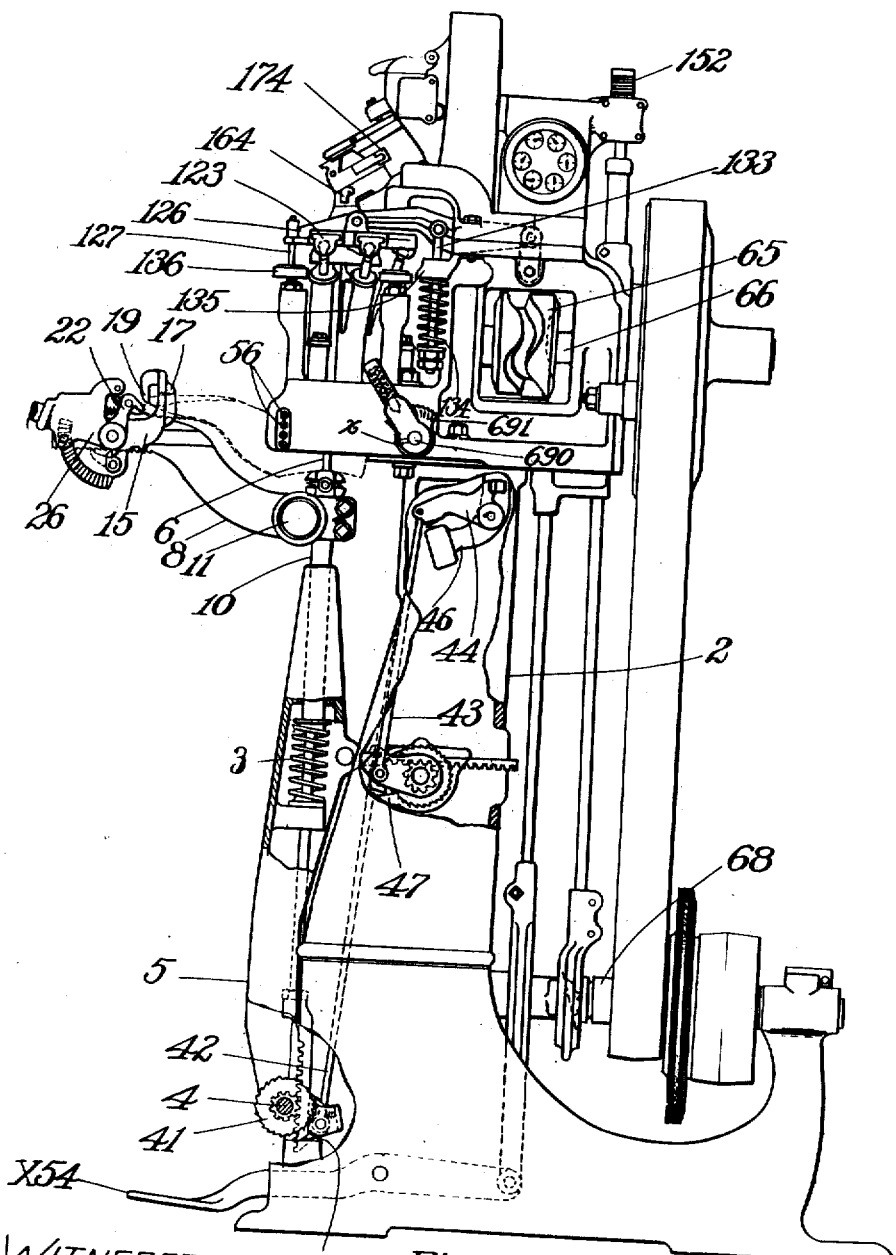

R. F. McFEELY.
MACHINE FOR USE IN THE MANUFACTURE OF BOOTS AND SHOES.
APPLICATION FILED AUG. 14, 1909.
1,129,881.
Patented Mar. 2, 1915.
9 SHEETS—SHEET 3.
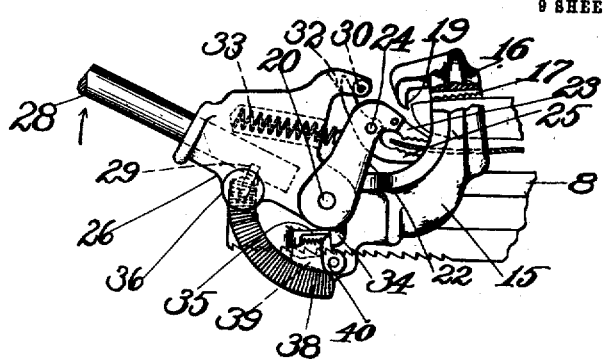
Fig. 3.
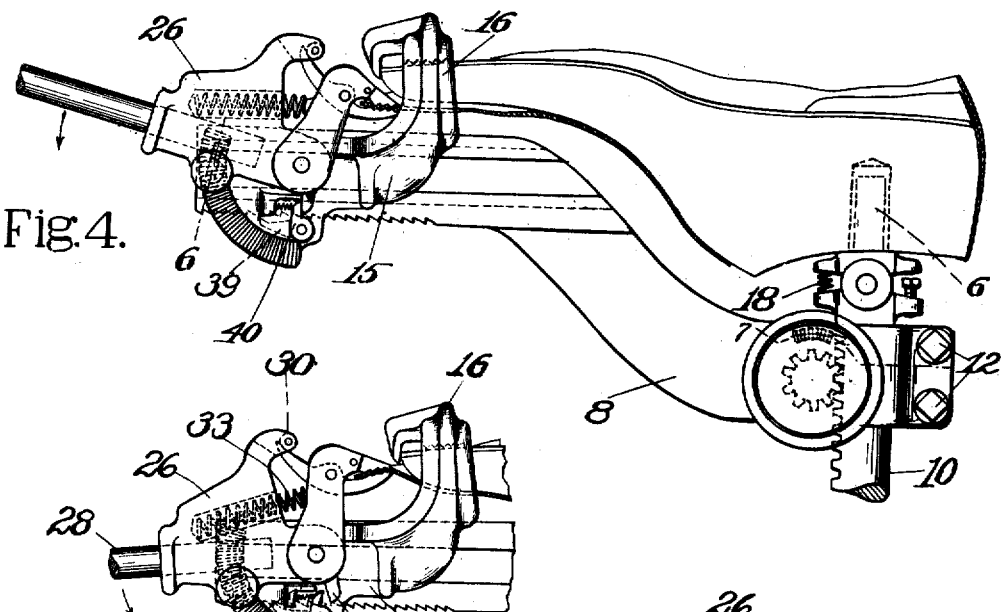
Fig. 4.
Fig. 5.
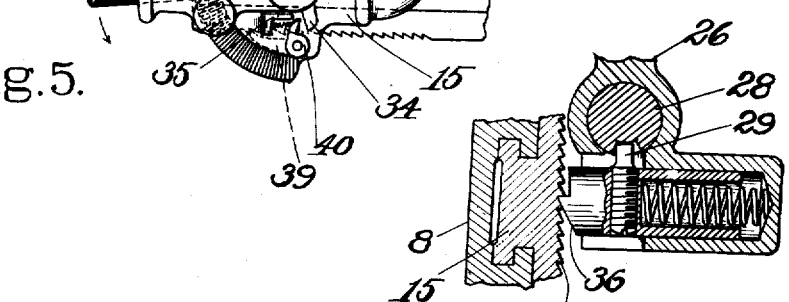
Fig. 6.
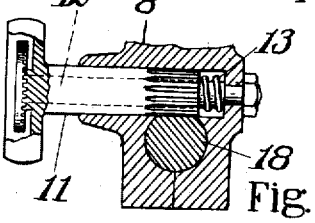
Fig. 7.
WITNESSES.
Elizabeth C. Coupe
Edith C. Holbrook
INVENTOR.
Ronald F. McFeely
By his Attorney
Nelson A. Howard R. F. McFEELY.
MACHINE FOR USE IN THE MANUFACTURE OF BOOTS AND SHOES.
APPLICATION FILED AUG. 14, 1909.

1,129,881.  Patented Mar. 2, 1915.
9 SHEETS—SHEET 5.

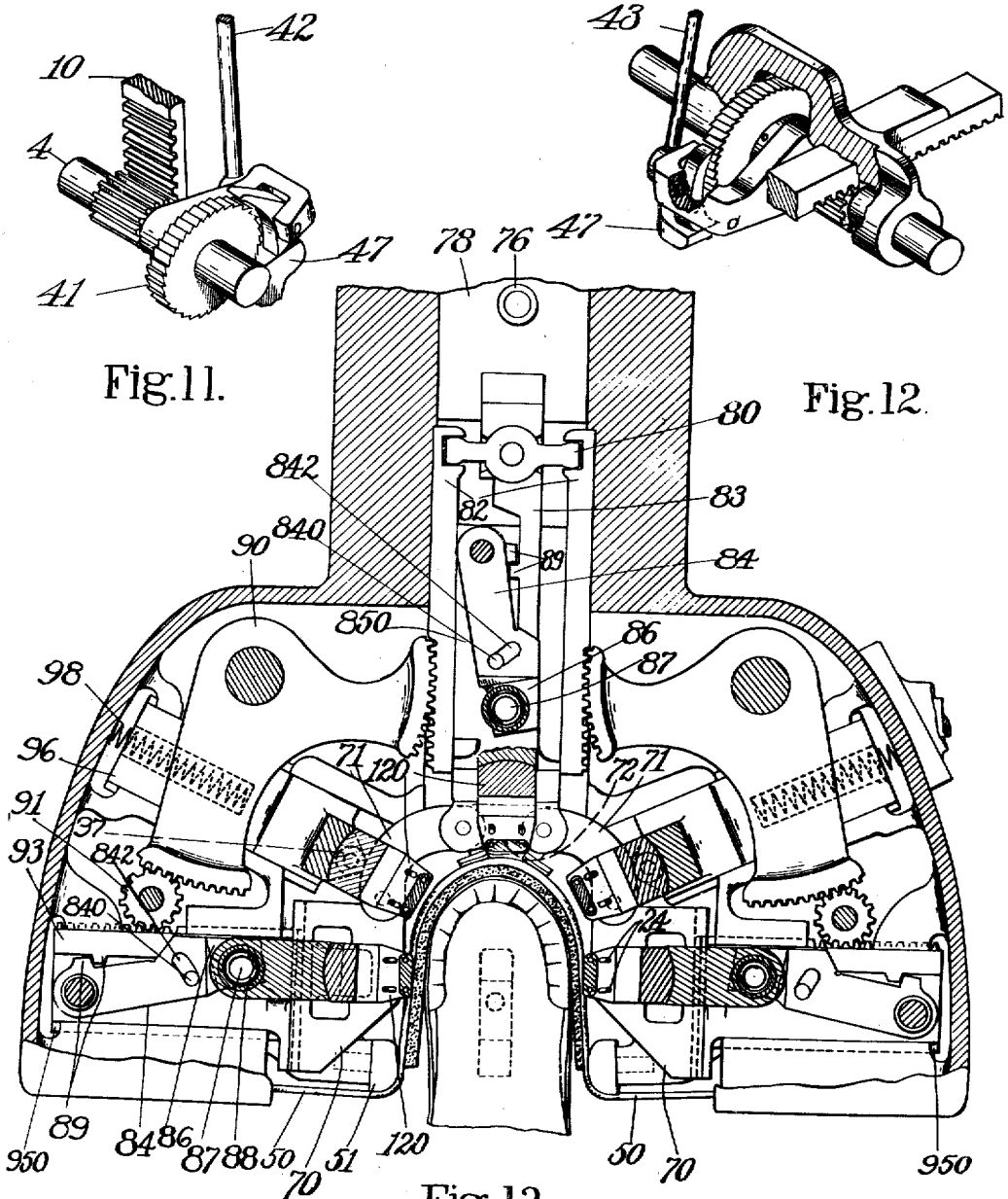

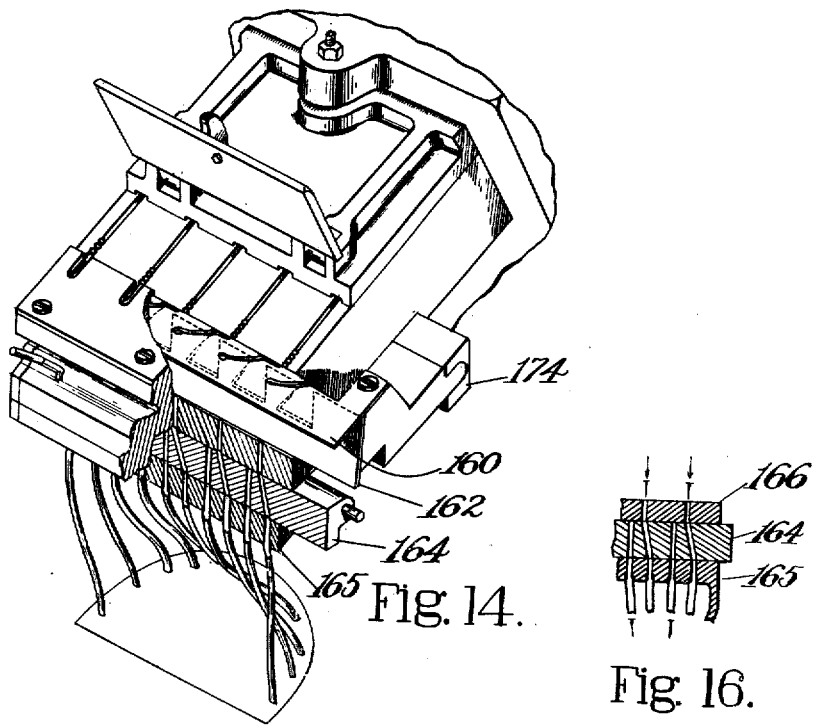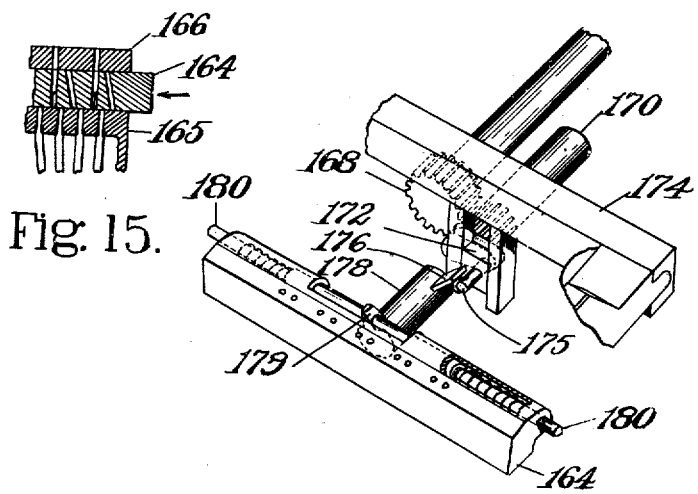

R. F. McFEELY.
MACHINE FOR USE IN THE MANUFACTURE OF BOOTS AND SHOES.
APPLICATION FILED AUG. 14, 1909.
1,129,881.
Patented Mar. 2, 1915.
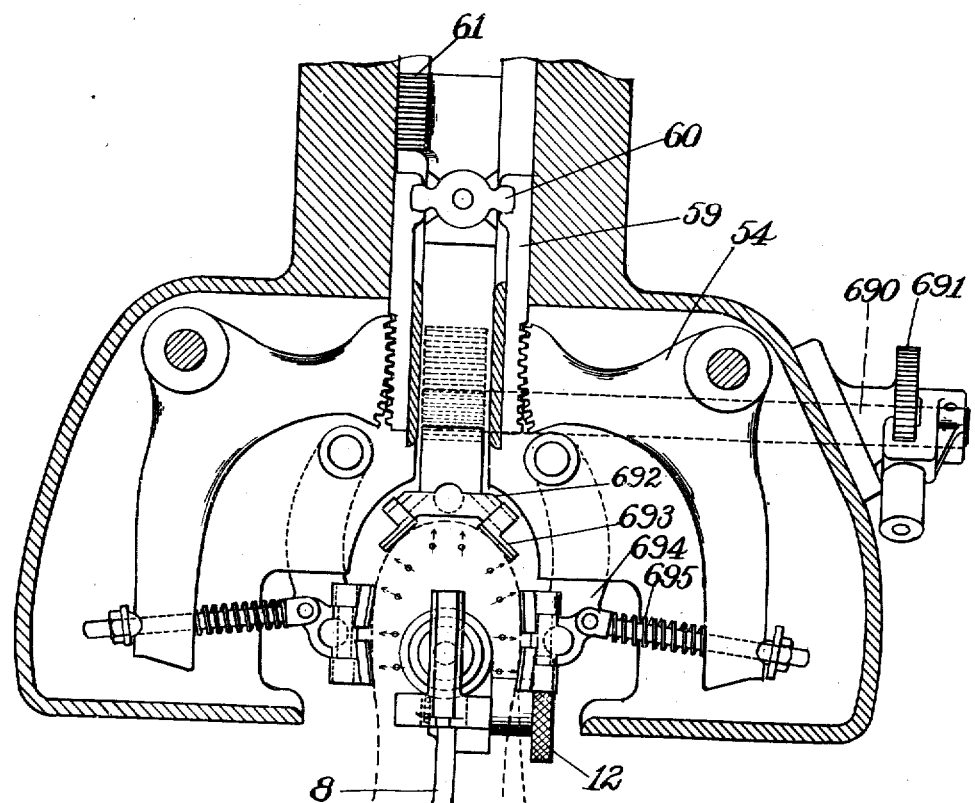
Fig. 18.
WITNESSES:
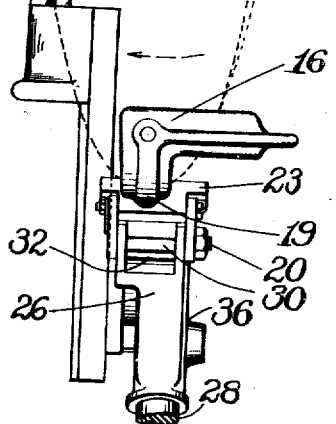
INVENTOR.

R. F. McFEELY.
MACHINE FOR USE IN THE MANUFACTURE OF BOOTS AND SHOES.
APPLICATION FILED AUG. 14, 1909.

1,129,881.

Patented Mar. 2, 1915.
9 SHEETS—SHEET 9.

WITNESSES.
Elizabeth C. Coupe
Edith C. Hollrock

INVENTOR.
Ronald F. McFeely
By his Attorney
Nelson W. Howard

UNITED STATES PATENT OFFICE.

RONALD F. McFEELY, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR USE IN THE MANUFACTURE OF BOOTS AND SHOES.

1,129,881.  Specification of Letters Patent.  Patented Mar. 2, 1915.

Application filed August 14, 1909. Serial No. 512,904.

*To all whom it may concern:*

Be it known that I, RONALD F. MCFEELY, a citizen of the United States, residing at Beverly, in the county of Essex and State of Massachusetts, have invented certain Improvements in Machines for Use in the Manufacture of Boots and Shoes, of which the following description, in connection with the accompanying drawings, is a specification, like reference characters on the drawings indicating like parts in the several figures.

This invention relates to the manufacture of boots and shoes.

A broad object of the invention is to produce a machine which shall combine the operations of assembling a shoe and lasting the heel seat, operations heretofore performed by separate machines and as distinct steps in the manufacture of a shoe. The assembling operation as heretofore performed includes positioning the innersole and the upper materials, including the upper, lining and heel stiffener, in proper relation to the last and to one another, and securing them together in that relation. At a later and entirely distinct stage in the manufacture of the shoe, after the operation of the pulling over machine, the heel seat was lasted.

One important feature of this invention consists in improved means constructed and arranged for use in assembling a shoe.

Another important feature of the invention consists in improved lasting mechanism; and a further very important feature of this invention consists in a combination of shoe assembling means and lasting mechanism.

The machine herein shown and described, which is adapted like the assembling machine to operate upon parts of a shoe loosely arranged about a last, combines the operations of the assembling machine and a heel seat lasting machine. After positioning the parts of the shoe at the heel in proper position and while holding them in proper relation the machine effects the heel seat lasting operation. By the use of this machine the temporary securing of the parts of the upper in assembled relation is rendered unnecessary as the lasting is effected while the machine holds the parts in proper assembled relation so that an important saving of time and expense is effected and a greatly improved quality of work is obtained by performing on this machine operations heretofore separately performed by different machines as distinct steps in the manufacture of the shoe.

Another important feature of the preferred embodiment of the invention consists in the combination with assembling or other apparatus in the use of which the upper is put under forward tension about the heel part of the shoe, of lasting mechanism which operates to last the heel portion of the shoe while such tension is maintained. In the illustrated embodiment of the invention the assembling operation is made to include also the step of forwardly pulling the upper to conform it, particularly its marginal portion, to the shape of the side faces of the last.

Another very important feature of this invention consists in automatically operating heel seat lasting mechanism, with or without heel seat tacking mechanism which is also operated automatically.

Novel features of this invention will be found in the construction and arrangement of the shoe supporting and pulling means, with its adaptations to the steps of assembling and adjusting the loosely applied parts of the shoe into proper relation and then straining the upper lengthwise of the last and holding it under tension about the rear portion of the last; in the provision for movement of the shoe so prepared backwardly into the heel embracing band of the lasting mechanism and the actuation of that band further to conform the upper materials to the contour of the heel portion of the last while the upper is so held under strain; in crimping or overwiping mechanism constructed and arranged to adapt itself to the shape of the last; in automatic operating mechanism by which overwiping mechanism is caused to act repeatedly on the same portion of the shoe; in provision for automatically changing the relative altitudes of the wipers and the shoe during the lasting operation; in the gang tacking mechanism by which the heel seat portion of the shoe is fastened; and in other combinations found in the illustrated embodiment of the invention, as will appear from the following description and the accompanying drawings.

These and other features of the invention including certain combinations of parts and more important details of construction will now be described in connection with the drawings and then pointed out in the claims at the end of the description.

Figure 2:
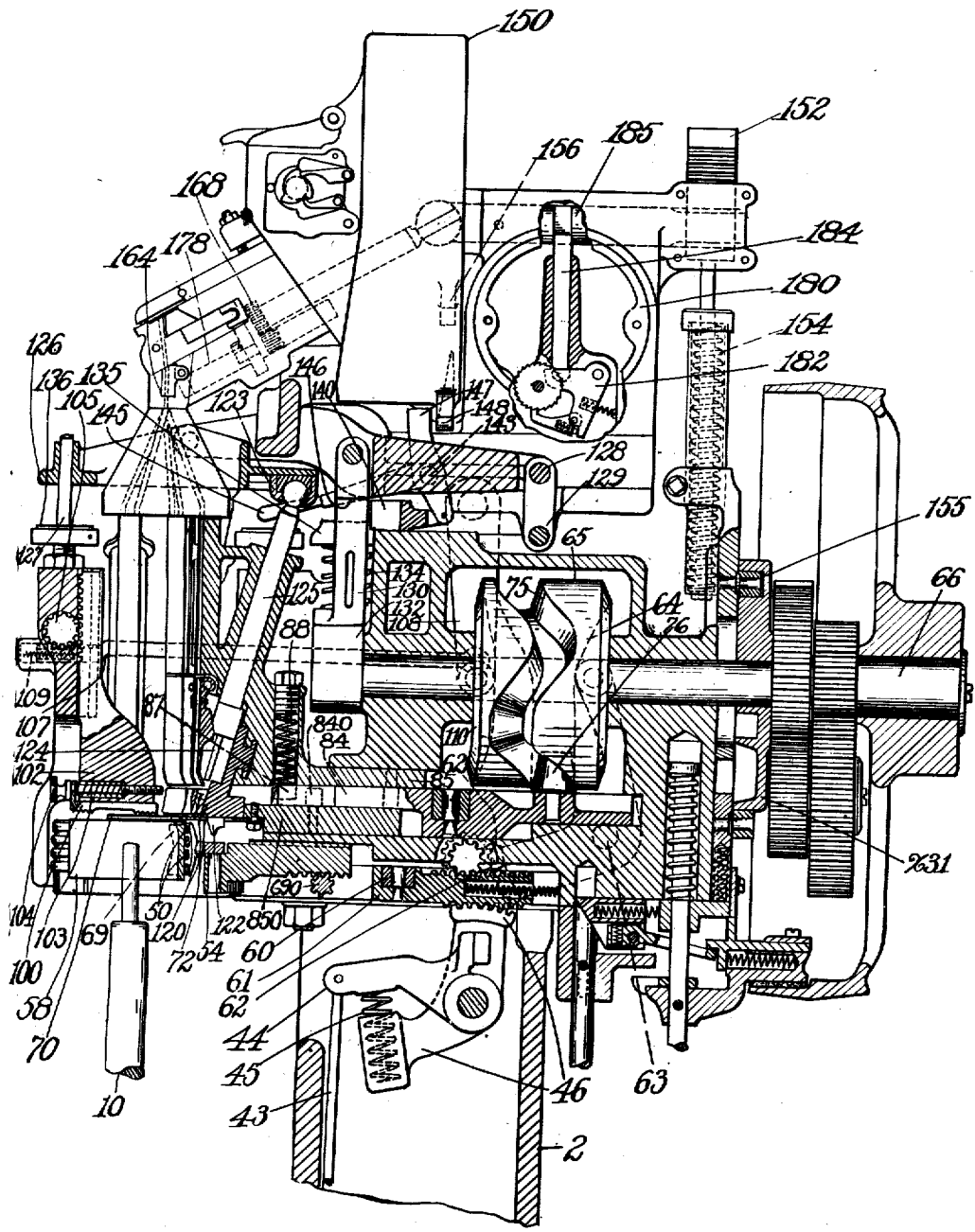
Figure 8:
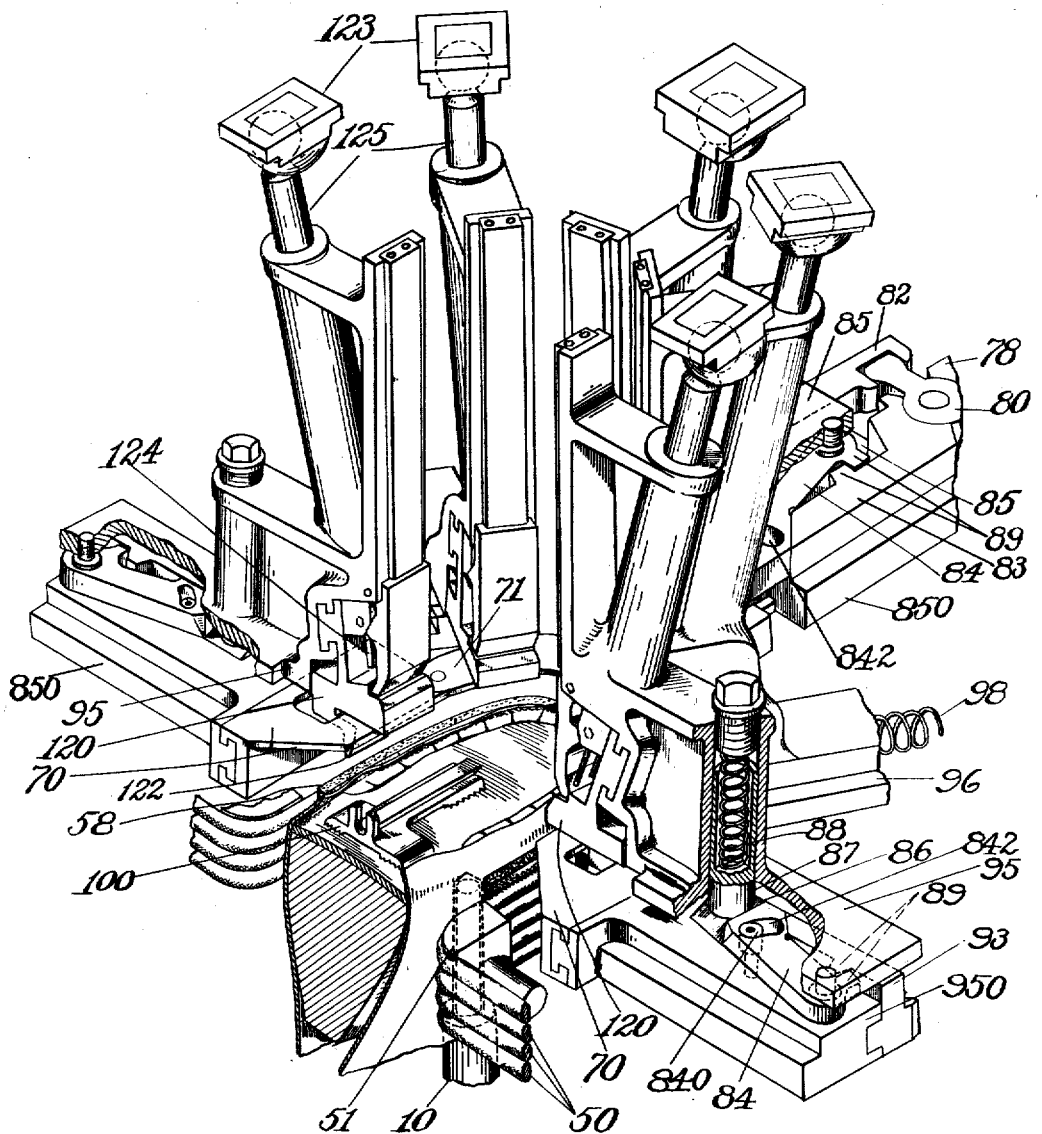
Figure 9:
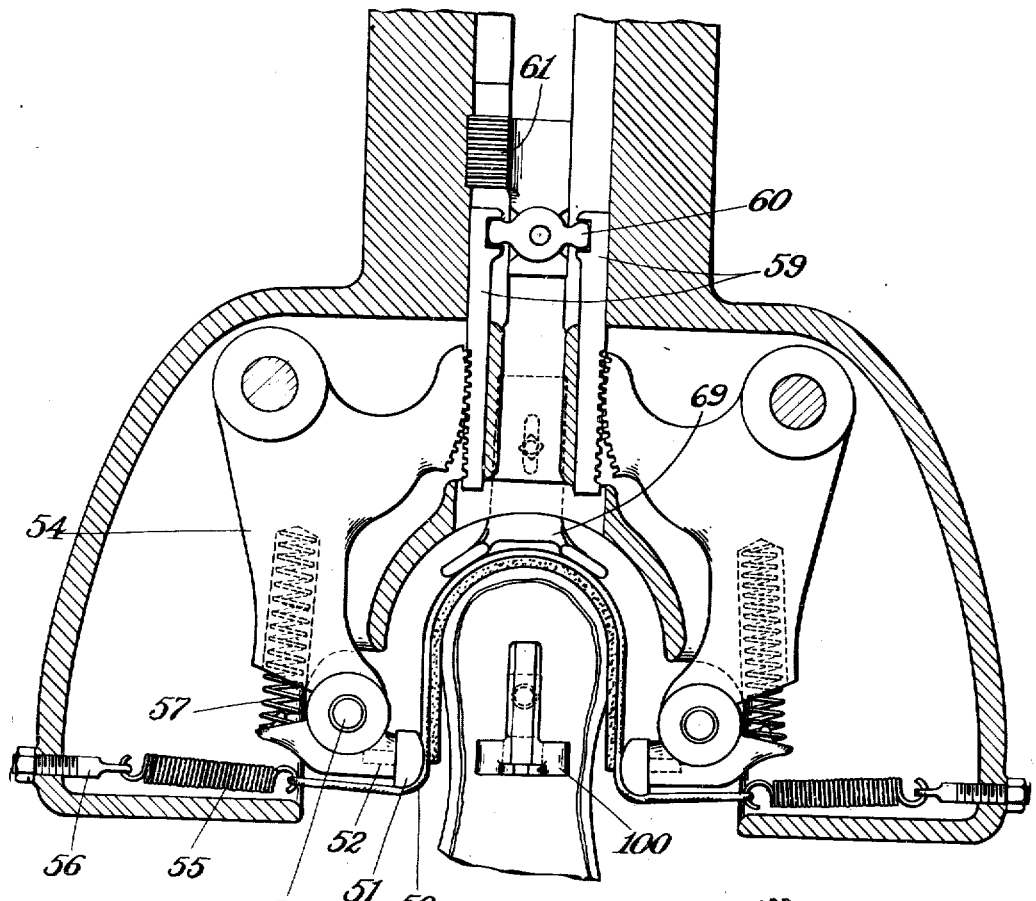
Figure 10:
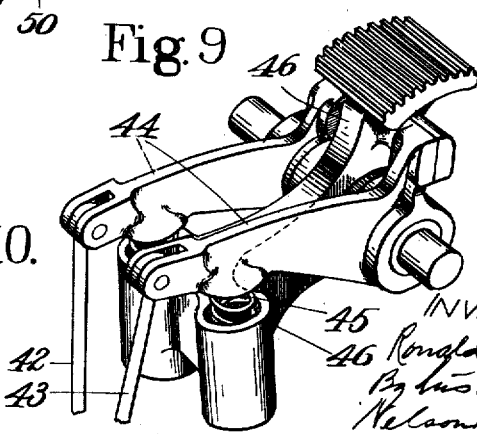
Figure 19:
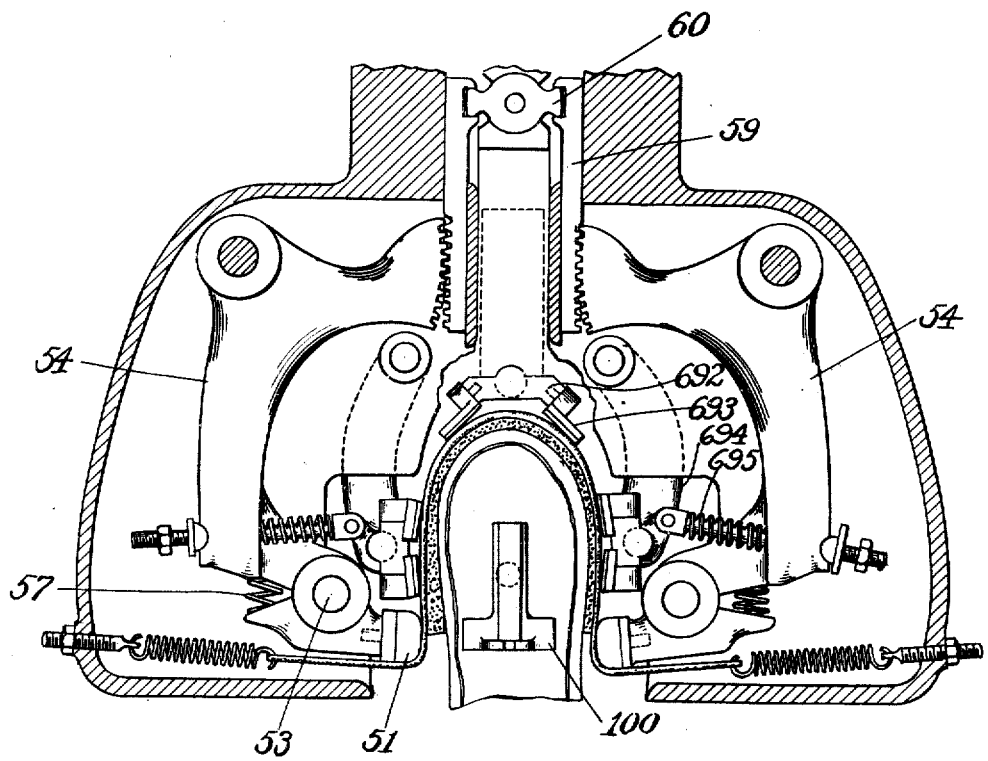
Figure 20:
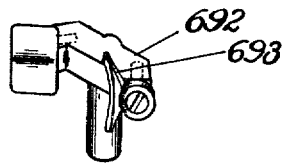

In the drawings illustrating one embodiment of my invention, Figure 1 is a side elevation; Fig. 2 is a vertical section of the head of the machine on a larger scale and in the plane of the driving shaft; Figs. 3, 4 and 5 are side elevations on a larger scale than Fig. 1 of the upper stretching mechanism in different positions; Fig. 6 is a section on line 6 of Fig. 4; Fig. 7 is a section on line 7 of Fig. 4; Fig. 8 is a perspective view of the heel seat lasting mechanism; Fig. 9 is a horizontal section showing the means for carrying the counter conforming band; Figs. 10, 11 and 12 are details concerned with the shoe support positioning and locking mechanism which is shown also in Figs. 1 and 2; Fig. 13 is a horizontal section on a higher plane than Fig. 9 showing the overworking and tacking devices for the heel seat; Fig. 14 is a perspective view partly in section of the tack supplying mechanism also shown in Figs. 1 and 2. Figs. 15 and 16 are sections of the tack distributing mechanism in different positions. Fig. 17 is a perspective view of the operating device for the tack distributer. Fig. 18 is a horizontal section in the same plane as Fig. 9 showing the clamps used instead of the heel band. Fig. 19 shows the side clamps and heel band used together. Fig. 20 is a perspective view of one of the clamps.

The machine comprises a base 2 upon the top of which is mounted the head carrying the heel seat lasting mechanism and to the side of which near the front is pivoted at 4 the shoe support or jack carrying the shoe assembling and upper pulling apparatus. The jack post 5 can swing outwardly to clear the last thereon from the machine for giving access to all sides of the shoe in applying the last to the heel pin 6 and assembling and adjusting the upper materials and the innersole in proper relation. The arm 8 carrying the upper pulling devices is mounted on the spindle 10 upon which it can be freely adjusted vertically by the pinion shaft 11, see Figs. 4 and 7, which is a sleeve with a toothed head embracing a serrated disk on a rod 12. A spring 13 maintains locking contact between the head and disk as shown in Fig. 7. The spindle 10 with the shoe and the pulling devices can turn about the axis of the spindle to present either side of the shoe to the operator in the assembling and adjusting operations and to permit right and left crooked lasts to be positioned appropriately with relation to the lasting mechanism. The arm 8 trends upwardly from the spindle and in its forward portion has a horizontal guideway located directly below the last in which a block 15 is movable lengthwise of the shoe. This block comprises an overhanging arm 16 which rises from one side thereof as shown in the drawings to give opportunity for the shoe to be swung laterally thereunder into position for the upper to be gripped and pulled, and for the toe of the last to be swung laterally while the grippers hold the upper whereby the upper may, in effect, be adjusted longitudinally about the last and the tip line of the upper straightened or positioned at the desired angle across the last. The arm 16 has a rest 17 for engaging the bottom of the last or the innersole thereon, the toe end of the last being held up by a spring 18 acting upon the heel pin, and a rest 19 for engaging the end face of the last when the block has been adjusted to the right position in the arm 8 for the particular shoe in hand.

The block 15 supports pivotally at 20 the upper pulling device which comprises a gripper carrier 22 which is an angular member or lever on which one gripping jaw 23 is rigidly fastened while the other jaw 25 is pivoted thereon at 24. The pivot 20 also serves as the fulcrum for the gripper operating member 26 having the handle rod 28 and the guideway, formed by the roll 30 and the wall 32, for the tail of the jaw 25. A spring 33 in the operating member presses forwardly against the carrier 22 and rocks its heel 34 against a lug 35 located on the carrying block 15 below the pivot 20. This spring holds the jaws forwardly with relation to the operating member so that they will not retract relatively to the upper until they have closed and gripped it. The operating member carries a pawl 36, see Fig. 6, for engaging a curved ratchet face 38 formed on the block 15 to maintain the position of the operating member when it is not being moved. The pawl, which is a sliding bolt, has a pin 29 that extends into a notch in the handle rod 28 which is capable of being turned far enough to retract the pawl from the ratchet face when the operating member is to be moved upwardly as for relaxing the pulling strain on the upper. The arm 8 has ratchet teeth on its lower face which are adapted to be engaged by a pawl 39 on the block 15, see dotted lines in Figs. 3, 4 and 5, to lock the block and all the parts carried by it against forward movement on the arm and give stability to the fulcrum 20 while the upper is being pulled and held under tension. The pawl 39 is normally held away from its ratchet by the engagement of heel 34 with the arm 40 of the pawl and is permitted to be turned up, by its spring, against the ratchet on arm 8 only after the gripper carrier with its heel 34 has been turned forwardly in pulling the upper as shown in Fig. 5. The arrangement of the spring 33 provides for holding the gripper carrier in a normal position determined by the engagement of its heel 34 with the lug 35 and with the jaws either open or closed depending upon the position in which the operating member 26 is held by its pawl 36. When the operator has applied the last to the heel pin with the upper materials and innersole loosely or otherwise placed thereon and positioned the slide 15 according to the length of the last with the rests 17 and 19 in the relation shown in Fig. 3 he will lift the handle rod 28 to open the jaws if they are closed. This movement forces shoulder 32 against the tail of jaw 25 to turn that jaw on its pivot 24 as will be clear from Fig. 5. The upper having been straightened out and properly positioned within the jaws the handle 28 will be depressed. The spring 33 holds the gripper carrier and its jaws from rearward rocking until they shall have gripped the stock and the roll 30 then engages the tail of jaw 25 for forcibly pressing it in the closing direction. In the continued downward movement of the handle rod the roll is pressed against the tail piece and acts therethrough to draw the grippers backwardly about fulcrum 20 to stretch the upper as will be understood by comparing Figs. 4 and 5. It is to be noted that the pulling movement of the grippers takes place about the pivot 20, the points of the jaws being raised as they pull so that the upper is bent about the end of jaw 25 to increase the holding power of the jaws with the increase in tension applied. Preferably the upper is not bent upwardly over the toe end of the last in a way to interfere with tightening the marginal edge of the upper throughout the length of the vamp and the grippers therefore hold the upper materials including the heel stiffener conformed to the contour of the heel of the last for the heel seat lasting operation.

The rests 17 and 19 constitute convenient means for positioning or adjusting the innersole lengthwise on the last bottom if the innersole is unattached to the last as it is in the manufacture of many shoes. When the innersole is to be positioned with relation to the heel end face of the last the block 15 may be initially positioned to have a slight backward movement before the stop 19 meets the end of the last and in this movement the innersole will be caused by the roughened rest 17 to slide heelward until it meets the heel stiffener or upper material. Then when the upper is pulled toeward the heel end of the innersole will be pushed forwardly until it is flush with the rear face of the last. These movements are slight and not enough to cause any objectionable bowing of the innersole but rather tend to cause the innersole to lay down snugly into the shank of the last as it should do to facilitate the heel seat lasting operation. If the innersole is to be positioned with relation to the toe end of the last the stop 19 may first be positioned against the toe of the last as in Fig. 4 and the innersole then abutted against the stop, the toe of the last being tipped downwardly enough to relieve contact of the rest 17 with the innersole during the adjustment of the latter.

The jack includes a spring 3 which as shown in Fig. 1 is strong enough to uphold the spindle 10 with the shoe thereon and when the upper has been satisfactorily pulled toeward and fitted to the last the jack post is swung inwardly, within the heel band and against a suitable back stop 69 the shoe being depressed to permit it to go under the heel bottom rest which will be described. The lower end of the spindle is formed as a rack which engages a pinion on the shaft 4 upon which the jack post is pivoted. This shaft also has a rigidly attached ratchet wheel 41 as shown in Figs. 1 and 11 which is engaged by a pawl on the lower end of a rod 42 to turn the shaft and its pinion in the direction for uplifting the spindle from the power shaft during the operation of the machine for a purpose which will be described. A similarly constructed but horizontally arranged rack bar, pinion, ratchet wheel and pawl connection shown in Fig. 12 is provided between the jack post and a rod 43 for inswinging the jack and the shoe from the power shaft, and these rods, which with their associated parts are shown in Figs. 12 and 13 on a larger scale than in Fig. 1, are connected to bell-cranks 44 mounted on a fixed pivot rod as shown in Fig. 10. The outer ends of the cranks 44 rest upon springs 45 in the outer arm of a bell-crank 46 the upper arm of which is a segment which, through suitable connections later described, receives motion from the power shaft. This movement upwardly for the rods is transmitted yieldingly by the separate spring 45 and turns the ratchets in the direction to uplift the spindle and shoe and to pull them backwardly into the machine. Reverse movement is transmitted to the rods unyieldingly through contacting faces of the upper arms of the bell cranks as may be seen from Fig. 10 and forces the tails of the pawls into contact with the stops 47 which swing the noses of the pawls away from their ratchets leaving the latter free to turn. This is the condition which exists between the end of one cycle of the machine's operation and the beginning of another cycle and prevails while the workman is removing one shoe and applying and pulling another shoe.

The illustrated heel lasting mechanism into which the shoe is thrust backwardly after the upper has been pulled and adjusted includes a plurality of separately movable parallel cords, bands, or the like 50 arranged to extend about the heel portion of the shoe from the shank on one side to the shank on the other. The end portions of the cords are bent outwardly over the swiveled heads 51 of blocks 52, pivoted upon the front arms of angle levers 54, and are attached to separate springs 55 which are independently adjustable by threaded anchors 56. A lining 58 of leather, rubber, felt or other suitable material is arranged within the bands 50 and distributes the pressure of the bands without interfering with their relative conforming movement to adapt them to the contour of each last when they are put under tension by the actuation of the levers 54. This is effected through the connecting rods 59 and equalizer 60, see Fig. 9, the latter being mounted on a toothed slide 61 which is engaged by a pinion, see Fig. 2, which is turned by a toothed angle lever 62, see Fig. 2, fulcrumed at 63 and having a roll in engagement with the rear cam face 64 of the cam block 65. This cam block is carried by the cam shaft 66 which is driven through a clutch and connections to the lower pulley shaft 68 which driving parts are or may be substantially like those shown and claimed in United States Letters Patent, 791,686, of June 6, 1905. This clutch mechanism need not be here further described than to state that it is actuated by a treadle $X^{54}$ to cause the machine to be started and that the cam disk $X^{31}$ has suitably formed and located rises to cause the machine automatically to come to rest at predetermined times which will be later noted. The backward movement of the slide 61 effected by the rise in the cam face 64 turns the angle levers 54, swings their front ends inwardly and, through the blocks 52, forces the bands and their lining toward the sides of the last. This inward movement of the levers 54 extends the bands 50, anchored to the screw bolts 56, putting the springs 55 under tension and causing those springs to exert an endwise pull on the bands for drawing forwardly upon the counter and upper as they are conformed to the sides of the last. The block 52 is pivoted to the lever 54 at 53 and a spring 57 maintains the block in a normal position. The location of the pivot 53 back of the head of the block causes that block to be projected forwardly as lever 54 closes toward the shoe. The slide 61, actuated from the cam face 64, is toothed on its lower face as shown in Fig. 2 to engage the upper arm of the angle lever 46 before described by which the shoe is lifted and pulled back into the machine and is locked there to receive the heel seat lasting operation. Any other mechanism suitable for clamping the heel portion of the upper materials to the last may be used instead of that above described. A back stop 69 is adjustably mounted in position to limit the backward movement of the shoe into the elastic heel band which is effected by the connection to the jack post through the rod 43. This insures a predetermined positioning of the shoe lengthwise with relation to the operating parts of the machine. The back stop is forked to center the shoe laterally independently of the band and thus assist in positioning the shoe laterally with relation to the lasting and tacking mechanism. In Fig. 18 the back stop is shown as formed on a rack bar adjustable by a shaft 690 having a handle at the side of the machine with a pawl in it to engage a locking ratchet 691, having marked on it graduations indicating the proper adjustment for different sizes. The ratchet can be adjusted to position the graduations for different groups of sizes such as men's, women's or children's sizes. In this figure and also in Fig. 19, the back stop is shown as provided with a swiveled head 692 on which in turn are swiveled two contact blocks 693. A detail of this device is shown in Fig. 20. In Figs. 18 and 19 there are also provided side clamps on arms 694 actuated by springs 695 on rods guided in the swinging arms 54, above described, to clamp the upper against the sides of the heel as shown. The contact members of these side clamps are like those located at the end of the heel and the front member at each side is located to press the end portion of the counter against the side of the last. These side clamps may be used in place of the heel embracing band 50, as illustrated in Fig. 18, or in addition to the band, as shown in Fig. 19, or they may be omitted altogether, as in Fig. 9, according to the nature of the shoes being assembled and heel seat lasted. If the shoes are of stiff material, the clamps will be useful in securing a good conformation of the heel stiffener to the contour of the last and if fine shoes are being lasted which have stiff counters the band will be employed to distribute the pressure of the clamps and avoid any danger of marring the stock. For light shoes the band alone will probably be sufficient.

The devices for breaking down the counter and upper over the edge and upon the bottom of the heel seat are shown best in Fig. 13 in connection with Fig. 2 and comprise the wiper plates 70, 70, 72 and the links 71, 71 arranged to embrace the entire heel end portion of the shoe and to wipe inwardly and forwardly over the heel as they are closed from the position shown in Fig. 13. These devices receive their movements from the cam block 65, before mentioned and shown in Fig. 2, which has a cam path 75 in which stands a roll 76 on a slide 78 that is connected by an equalizer 80 with bars 82, see Fig. 13, and also carries the rigid forwardly projecting arm 83. This arm 83 has a yielding connection with the wiper plate 72 provided by the following arrangement: The arm 83 has a beveled end face which abuts against a similar face on a displaceable member 84 that is pivoted to a slide 85 and by which the wiper 72 is actuated through the stud 840 and sub-slide 850. The member 84 has a beveled upper face at 86 upon which rests a beveled plunger 87 carried in the slide 85 and pressed upon by a heavy spring 88, see Figs. 2 and 13. The spring plunger maintains the members 83, 84 normally in the relation shown in Fig. 13, but permits the member 84 to turn and the movement of the wiper 72 to cease when resistance to such movement overbalances the tension of the spring 88. Normally however the wiper will overcome any resistance offered by the work and complete its stroke into predetermined position over the last bottom to wipe the upper into position to be tacked. The tacking is effected by mechanisms to be more fully described and each of which includes a tack block 120 carried by the slide 85 and having a depending lip or stop 122 to meet the side of the last, or the heel band that embraces the last, and position the tack blocks for tacks to be inserted at a definite distance from the edge of the shoe bottom. When this stop 122 arrests the movement of the slide 85 the beveled faces of members 83, 84 wedge sidewise against the influence of spring 88. The member 84 has a cam slot 842 into which the stud 840 of the sub-slide or wiper slide 850 projects and when member 84 is wedged sidewise as described the cam slot 842 acts on the stud 840 to retract the wiper slide and wiper slightly with relation to the shoe and with relation to the tack block so as to permit the tacks to be driven into a portion of the upper which has been wiped in and pressed down by the wipers to smooth and prepare it for the reception of the tacks. The machine thus automatically follows in this respect the well known and advantageous procedure of the operator of manually actuated bed lasting machines who "backs up" his wipers preparatory to tacking the heel seat. The members 83, 84 have coöperating lugs 89 by which member 84 is returned to its initial position when member 83 is retracted.

The bars 82 connected with the equalizer 80, see Fig. 13, have toothed engagement with angle levers 90 which in turn have toothed connection through pinions 91 with rack bars 93. Each rack bar 93 is connected with a slide 95 corresponding to the slide 85 of the heel wiper actuating mechanism which actuates the side wiper plates 70 by the same arrangement, including parts 84, 840, 842, 86, 87, 88, 89 and 950, that connects the bar 83 to the wiper plate 72. These parts are illustrated in Fig. 8 as well as in Fig. 13. The wiper plates 70 have an endwise sliding connection with the slides 950. The links 71 are pressed against by rolls 97 on plungers 96 which are guided for movement in a direction substantially perpendicular to the corners of the heel of the last being operated upon, or the curved portions connecting the back end of the heel and the sides of the heel. The plungers 96 are pressed forwardly by stiff springs 98 to hold the links up to their work of breaking down the upper and counter as the wipers and links are advanced and closed in over the heel seat.

The construction and arrangement of the parts just described provides that movement will be transmitted from the cam path 75 to the wiper plate 72 and through that plate and the links 71 to the wiper plates 70 to advance the wipers. This carries the wiper 72 over the heel seat of the shoe and moves the wipers 70 endwise in blocks 950 and the links forwardly with relation to the plungers 96. Simultaneously with this forward movement motion is transmitted through the angle levers 90 and the described, independently yielding, connections to close the side wipers and the corner wipers or links 71 inwardly over the heel seat, thus gathering the upper inwardly in substantially radial lines over the heel seat. The provision for effecting the forward movement and the inward movement from each side of the shoe through independently yielding connections permits the wiping or breaking down means to adapt or conform itself to the contour of each shoe and this is facilitated by the flexible connection 71 between the plates 70, 72, which act at the ends and back of the heel seat. The independently yielding connections also facilitate the adaptation of the wipers to the shape and position of right and left shoes which differ greatly when made on crooked lasts. This however is largely provided for by arranging the jack so that the shoe can swing laterally about the axis of the spindle 10 to center both right and left shoes in the lasting devices.

The cam path 75 is formed, see dotted lines representing the back of the cam block in Fig. 2, to give a slow inward actuation of the breaking down means and then, see the full lines on the front side of the cam block, to retract these means and advance them a second time in the same cycle of the machine's operation. It is intended that the first or essentially breaking down advance shall take place with the shoe in a lower position than the second or wiping in and ironing down movement. Accordingly, means for controlling the vertical position of the shoe is provided and is connected with means for changing that vertical position automatically between the two actuations of the upper overworking means. The shoe bottom rest 100 is formed as shown in Fig. 8 to contact with the shoe bottom at a plurality of points including points at opposite sides of the innersole near the heel breast line to position the shoe as to transverse inclination of the heel bottom and to clamp the insole down firmly upon the last bottom near its opposite edges. This bottom rest is movable endwise in a guideway formed in the lower face of a block 102 and is pressed forwardly therein by a spring 103 against an adjusting screw 104. The block 102 is guided for vertical movement in the machine head and has rack teeth engaged by a pinion 105 coupled by a rack rod 107 to a lever 108 which is fulcrumed at its upper end and is held by a spring, 109, acting on the rack rod, against a cam face 110 formed on the front end of the cam block 65. This cam face is formed with relation to the cam track 75 for the bottom rest to be raised between the first and the second advance of the wipers so that the shoe may come up to the level of the wipers before their second advance, whereby the upper is caused to be firmly wiped or ironed down upon the last bottom to form a firm, smoothly lasted heel seat. The lifting of the shoe is effected by the strong spring 45 located in the jack lifting mechanism which is put under tension when the jack is locked up. The cam face 110 is also formed to depress the bottom rest again after the tacks are driven, as will be described, and before the wipers are finally retracted. This is to depress the shoe from the wipers and to relieve the pressure of the wipers and prevent them from dragging over the lasted and tacked upper in their final retraction. It will be remembered that the wipers are partially retracted before the tacks are driven so that the tacks may be inserted through a portion of the upper that has been smoothed and compacted by the wipers as is customary in the use of hand operated lasting machines.

The slides 85, 95 and 96 support the tack blocks 120 of which there are five mounted in said slides as shown in Figs. 8 and 13 to have a small amount of angular movement in a horizontal plane. These blocks have projections extending downwardly through slots in the wipers and carrying feelers or gages 122 arranged to engage the side of the shoe, or the counter clamping bands and thereby limit the inward movement of the tackers and also determine the position with relation to the edge of the shoe at which the tacks shall be inserted. The gages also effect the necessary turning of the tack blocks in their slides to position at substantially the same distance from the edge each of the two tacks which the blocks are arranged to carry. The tack pockets in the blocks 120 are inclined so as to drive the tacks toward the center of the heel and the drivers 124 are similarly inclined. This arrangement provides that the ingoing tacks which are simultaneously driven all the way around the heel seat shall by reason of their inclination draw the upper inwardly from the edge of the last. These tacks are driven in front of the wipers into a portion of the upper materials which therefore is not held down in lasted position and the indrawing effected by the inclined tacks is therefore particularly advantageous because it takes up or reduces the slack that otherwise would be liable to exist between the line of tacks and the edge of the wipers. A single driver rod 125 carries two drivers 124 and the turning movement of the tack block takes place about the axis of that rod which is connected by a slide block 123 and a ball joint to the driver plate 126 guided to move in rigid lines by the post 127. The driver plate is the broadened front end of a lever fulcrumed at 128 upon a link 129 and having a depending hinged link 130 the foot of which rests upon a cam 132 on the front end of the cam shaft 66. This cam serves to lift the driver lever and the drivers against the tension of springs 134 suspended by rods 133 from the lever to be compressed against a shelf 135 on the frame preparatory to actuating the driver lever downwardly to insert the tacks when the cam permits said springs to close. Adjustable stops 136 on the frame limit the down stroke of the drivers and determine the extent to which the tacks shall be driven.

A forked slide block 140, see Fig. 2, resting on the machine frame is adapted to be advanced by a T lever, pivoted at 143 and having a handle arm 145, into a position under shoulders 146 on the lever-raising link 130 and prevent the descent of the lever for driving the tacks until the operator has had opportunity to examine the shoe after the second inwiping of the lasting devices. The slide block may then be retracted to permit the driving of the tacks, or if the shoe is not properly lasted and must be submitted to a second cycle of the machine's operation the block may be left until a suitable time in the next cycle when it will be automatically retracted by the engagement of a wedge 148 which is shown as carried by the rotating tack hopper 150 with the upper arm 147 of the lever. The tacks are fed by mechanism later to be described from the hopper 150 which is oscillated by a rack bar 152 through a spring 154 from a cam track 155 in the side of the cam $X^{81}$ on the cam shaft 66. These parts do not in themselves form a part of this invention and may be of previously known construction.

The hopper has a stud 156 between which and the wedge 148 the arm 147 is set when the slide block 140 is advanced to obstruct the descent of the drivers. This stud prevents the oscillation of the hopper through a great enough angle to effect the separation and feeding of a second set of tacks until the set which is waiting to be driven has been inserted and if the cycle of the machine is completed without driving the waiting set then the feeding mechanism is rendered ineffective for that cycle but the wedge 148 forces the tack stopping devices to normal position in time to permit delivery of tacks for the next cycle. The block 140 and the arm 147 constitute connected means for controlling the feeding and the driving of the tacks. By the use of these devices the machine can be made to repeat its cycle as many times as may be required with the tacking mechanism each time ineffective and thus a particularly stubborn shoe be lasted in by successive operations of the wipers and finally tacked when it is in satisfactory condition.

The tacks which gravitate down the raceway grooves, Fig. 14, from the hopper are separated by a slide 160 with which moves a notched gate 162 and are delivered through the oblique slots and eyes in said plate as described in United States Letters Patent No. 1,002,421, granted on my application Sept. 5, 1911. There are five raceways and the separating mechanism is arranged to be reciprocated twice in each cycle of the machine to deliver ten tacks, which is the number the machine is designed to drive at one time. To this end a receiving plate 164 is provided which is guided for endwise movement between the conductor or tack tube anchor plate 165 and a cap plate 166. The receiving plate has ten pockets arranged in two series alternating and so positioned that when the first series is in receiving position the points of the tacks will rest upon the anchor plate and will not be discharged into the tack tubes until the receiving plate has been moved to put the second series of pockets in receiving position in time to take the tacks from the second actuation of the separating devices. At this time the first set of tacks will be discharged into the tubes and the second set will fall directly through the receiving plate into the tubes as shown in Fig. 16 so that the two sets of tacks fall into the tubes which lead them to their pockets under the devices, Fig. 2, at nearly the same time. This concentrates the tack delivering period and leaves the remainder of the time occupied by the cycle of the machine for other operations. One series of tack pockets is arranged oblique to the other so that the extent of movement of the receiving plate to position all its pockets in alinement with the tubes in the conductor plate and discharge the tacks may be different from the spacing between the tubes in the conductor plate. A different number of tacks may be fed in any multiple of the number of the raceway grooves. For actuating the separating devices to take from the raceways two charges of tacks in each cycle the pinion 168 which formerly directly reciprocated the separating devices meshes with a pinion 170 of half the number of teeth which has a crank connected to the block 172 in the depending fork of the separator driving bar 174 and from which that bar and the separating devices receive a complete reciprocation from the oscillatory movement of the pinion 168 and the hopper in one direction and a second complete reciprocation from the oscillatory movement in the other direction. The crank block has a stud 175 arranged to contact at times with an arm 176 on a shaft 178 that has a tooth 179 having a yielding connection with the delivery plate by means of spring plungers 180 as shown in Fig. 17. This arrangement is such that as the stud 175 turns downwardly and to the left in Fig. 17 it leaves the arm 176 and the delivery slide 164 at rest in what may be considered to be the discharging portion of the slide until the stud nearly completes its rotary stroke when it will reach a position to contact with the upper side of the arm 176 and move the delivery slide into its first receiving position shown in Fig. 15, in time to take the first set of tacks discharged from the oblique slots and eyes of the separating plate 160. On the reverse oscillation of the pinion 168 and the hopper the stud will leave the arm 176 again and not contact with it until it approaches the Fig. 17 position whereupon it will turn the arm and move the delivery slide to the left in the figures to discharge the first set of tacks into the tubes Fig. 16 and receive the second set from the separator plate, as shown in Fig. 16.

An indicator is often used with machines of this type for the purpose of recording the amount of work done and in Figs. 1 and 2 an indicator 180 which may be of any usual form is shown as built into the machine head so that it cannot be tampered with. The actuating lever 182 of the indicator is connected by a plunger 184 with an eccentric portion of the shaft 185 of the hopper which, it will be recalled, is locked by the arm 147 to prevent it from being actuated whenever the machine is caused to repeat its operations on a shoe. By this arrangement the indicator is caused to record the number of shoes operated upon as distinguished from the number of cycles through which it is caused to run.

In the use of the machine the work may be prepared by applying the upper, linings and heel stiffener loosely to the last and the inner sole will be placed loosely upon the last bottom in a McKay shoe, as is usual, while in making welt shoes the usual practice of tacking the innersole to the last bottom may be followed if preferred. The shoe will then be applied to the heel pin of the jack, the latter being tipped forward on its pivot 4. The toe of the shoe may then be swung under the rest 17 and the upper will be inserted in the grippers 24, 25 and pulled and the several parts of the upper materials be adjusted into proper assembled position on the last substantially as described in United States Letters Patent 855,831, for method of making shoes. When the parts of the shoe are in correct assembled relation with one another and with the general lines of the last, and the upper strained forwardly to conform it snugly to the heel portion of the last with its marginal edges held under tension, the jack will be tipped backwardly into the heel lasting mechanism. The treadle $X^{54}$ is then depressed for starting the machine which runs through a portion of its cycle determined by the formation of the cam $X^{31}$ and then stops automatically. As herein shown the cycle is divided into three steps and the machine comes to rest after the locking of the jack and the tightening of the heel bands and again between the second closing of the overworking wipers and the insertion of the tacks to permit the operator to inspect the work and, by hand operations, make any adjustments that may be required for securing a satisfactorily lasted heel seat. The second stop may be omitted or this stop, and also the first stop, may be optional with the operator if desired. This would permit speeding of the machine by a skilful operator and upon cheap work wherein nicety of adjustment is not required. The clutch mechanism to which reference is made is arranged to bring the machine always to a stop at the predetermined points but it may be modified so that if the workman retains his foot on the treadle the machine will skip the intermediate stops and continue running to the end of its cycle; and further the cam $X^{31}$ may be changed to add a stop either necessary or optional between the first and the second wiping. The raising of the bottom rest and the lifting of the shoe following it by the expansion of the yielding element in the jack lifting mechanism takes place automatically between the two overworking operations of the wipers. This lifting of the shoe may be made more radical by adding to the formation of the cam face 64 in an obvious way to cause the bell crank lever 46 to be rocked before or during the second advance of the wipers and force the shoe upwardly. This change in the cam will also effect a supplemental tightening of the heel band after the breaking down of the upper caused by the first closing of the wipers and this is desirable in lasting stubborn upper materials. If the shoe is a difficult one to last the operator may suspend the driving of the tacks that are in the tack blocks and the delivery of a second set of tacks by shifting the hand lever 145 to set the block 140 and the stop 147. The operator will then watch the wiping over operation and if it is satisfactorily done he will withdraw the block and stop and permit the upper to be fastened by the tacks. If it is unsatisfactory the shoe will be subjected to another cycle of the machine's operation and the block and stop will be withdrawn at the proper time to permit the upper to be secured and a set of tacks fed into place to be driven into the next shoe.

Those novel features of this invention which relate only to the tacking mechanism are not claimed herein but constitute the subject-matter of a divisional application Serial No. 621,514, filed April 17, 1911.

Having explained the nature of this invention and described a construction embodying the same in the best form now known to me, I claim as new and desire to secure by Letters Patent of the United States:—

1. A machine of the class described, having in combination, a last spindle, a gripper support extended therefrom, and a gripper mounted on the support in position to pull an upper applied to a last on the spindle, said machine having means for fixing the gripper in different positions of adjustment both vertically and horizontally relatively to the last spindle for lasts of different heights and lengths.

2. A machine of the class described, having in combination, a last spindle, a gripper support extended therefrom and adjustable vertically thereon, a gripper mounted on the support, and means for fixing the gripper upon the support in different adjusted positions.

3. A machine of the class described, having in combination, a last spindle, a gripper support extended from the spindle, a gripper adapted to be fixed in different adjusted positions thereon lengthwise of the shoe, and means for actuating the gripper in its adjusted positions to pull the upper forward on the last.

4. A machine of the class described having, in combination, shoe resting means including an abutment for the toe end of the last, a gripper arranged to engage the forepart of the upper and mounted for movement longitudinally of the last away therefrom to pull the upper lengthwise, and means for actuating the gripper.

5. A machine of the class described having, in combination, shoe resting means including abutments for the bottom and for the toe end of the last, a gripper arranged to engage the toe portion of the upper, and means for actuating the gripper forwardly and upwardly with relation to the last for pulling the upper lengthwise.

6. A machine of the class described, having in combination, a last spindle, a support extended therefrom, and an upper pulling device mounted on the support including an abutment for the last and jaws for pulling the upper forward.

7. A machine of the class described, having in combination, a last spindle, a support extended therefrom, a block mounted in the support and having an abutment for the toe end of the last, and upper pulling jaws fulcrumed in the block and arranged to pull the upper forward on the last.

8. A machine of the class described, having in combination, a last spindle, a support extended therefrom, a block mounted in the support and having an abutment for the toe end of the last, an abutment for the bottom face of the last, and gripper jaws fulcrumed in the block to pull the upper forwardly and upwardly.

9. A machine of the class described, having in combination upper pulling means comprising a rest for the toe end face of the last, a rest for the bottom face of the forepart of the last, jaws for gripping the upper, and means for moving the jaws to pull the upper forward on the last.

10. A machine of the class described, having in combination, a last support, and upper pulling means comprising an abutment for the toe end face of the last, a pivoted gripper for pulling the upper lengthwise of the last with relation to said abutment, and manually operated means for actuating the gripper.

11. A machine of the class described, having in combination, a last support, a block including an abutment for the last, grippers pivoted on the block, and a lever for closing the grippers and swinging them about their pivot to pull the upper forward.

12. A machine of the class described, having in combination, a last support, a block, grippers pivoted to the block below the last, and means for closing the grippers and rocking them about their pivot to pull the upper toeward and upward.

13. A machine of the class described, having in combination, a last support, a block, a gripper jaw pivoted to the block, a second jaw pivoted to the first, and an operating device arranged to engage the second jaw to close the jaws on the work and then rock them about the pivotal connection of the first jaw with the block.

14. A machine of the class described, having in combination, gripper jaws arranged to pull an upper, and an operating device therefor having a handle capable of independent rotation, and means controlled by said rotation for locking and unlocking the operating device.

15. A machine of the class described, having, in combination, means for supporting a last in inverted position, grippers arranged to engage the toe portion of the upper, a support located below the grippers and below the last bottom and about which the grippers can have pivotal movement for pulling the upper, and means for actuating the grippers angularly about said pivot to pull the upper, the arrangement being such that the upper is bent to increase its frictional engagement with the end of the lower jaw of the grippers as the pulling movement proceeds.

16. A machine of the class described, having in combination, the shoe support 10, the gripper support 8 thereon, and the adjustable connections comprising a rack on the support 10, the toothed sleeve 11 having a hand wheel, the rod 12 having a locking head, and the spring 13 to press the hand wheel and the locking head together.

17. A machine of the class described, having in combination, the shoe support 10, the gripper support 8 thereon, the block 15 movable in the support 8, the pawl 39 for locking the block, the gripping means movable upon the block after it has been locked, and the pawl 36 for locking the gripping means.

18. In a machine of the class described, means for positioning an inverted last, a gripper arranged adjacent to the toe of the last and pivotally supported at a point below the last, and means for actuating the gripper about said pivot to pull the upper forwardly and upwardly.

19. In a machine of the class described, means for positioning an inverted last, a gripper arranged adjacent to the toe of the last, and comprising an angle lever pivoted at the lower end of the upright arm and having one of the gripping jaws on the horizontal arm, a coöperating jaw, and means for actuating the gripper about the pivotal connection of said upright arm.

20. In a machine of the class described, means for positioning an inverted last, a gripper arranged adjacent to the toe of the last, and comprising an angle lever pivoted at the lower end of the upright arm and having one of the gripping jaws on the horizontal arm, a coöperating jaw, and means acting through said coöperating jaw to close it upon the work and then move the lever about said pivotal support for the upright arm to pull the upper.

21. A machine of the class described, having in combination, means for gripping an upper at the toe, pulling it forwardly and holding it under lengthwise tension without bending it over the toe end of the last, and means for lasting the heel seat of the shoe while the upper is thus held.

22. A shoe making machine, having in combination, means for engaging an upper, operating means for relatively moving said engaging means and the last lengthwise of the upper in the direction for straining the upper forwardly on the last, and automatically operating means for lasting the heel seat portion of the shoe.

23. A shoe making machine, having in combination, means for engaging an upper, operating means for relatively moving said engaging means and the last lengthwise of the upper in the direction for straining the upper forwardly on the last, automatically operating means for lasting the heel seat portion of the shoe, and automatically operating means for tacking the upper.

24. A shoe making machine, having in combination, means for straining an upper forwardly on a last, and means operated automatically a plurality of times over the same portion of the heel seat to wipe the upper into lasted position over the heel seat of the last.

25. A shoe making machine, having in combination, manually operated means for engaging an upper, operating means for relatively moving said engaging means and the last lengthwise of the upper in the direction for straining the upper forwardly on the last, and automatically operated means for lasting the entire heel seat portion of the shoe while the upper is held under strain.

26. A shoemaking machine having, in combination, means movable forwardly relatively to the last for straining the upper toward the toe end of the last, and mechanism operating automatically while such forward strain is maintained for lasting the heel seat portion of the shoe.

27. A shoemaking machine having, in combination, means for engaging an upper, operating means for relatively moving said engaging means and the last lengthwise of the upper in the direction for straining the upper forwardly on the last, and means for fastening the upper to the innersole on both sides of the rear part of the shoe while the forward strain is maintained.

28. A shoemaking machine having, in combination, means for straining an upper forwardly on a last, and means operating automatically to lay the upper inwardly over the last bottom on opposite sides of the rear part of a shoe and to fasten the upper on both sides while the forward strain on the upper is maintained.

29. A shoe making machine having in combination, lasting means comprising wiper plates constructed and arranged to fold in the upper about the entire end portion of a last simultaneously, means for actuating said plates to do their work, and means arranged to be automatically set into motion to fasten the upper after a predetermined number of actuations of the wiper plates.

30. A shoe making machine having in combination, lasting means comprising wiper plates constructed and arranged to fold in the upper about the entire end portion of a last simultaneously, means for actuating said plates to break the upper materials over the edge of the last, and then relatively actuate the plates and the last to press the upper down upon the last bottom, and operatively connected means for inserting fastenings to secure the upper while it is held by the wipers.

31. A shoe making machine having in combination, lasting means comprising wiper plates constructed and arranged to fold in the upper about the entire end portion of a last simultaneously, means for inserting a plurality of fastenings simultaneously to fasten the upper about the end portion of the last, and power driven means to actuate the wipers a predetermined plurality of times and then automatically start the inserting mechanism.

32. A shoe making machine, having in combination, means for gripping an upper at the toe end and pulling it to put and hold the marginal edge of the upper under lengthwise tension about the heel end of the last, means for actuating the gripper, and means for lasting the heel seat of the shoe while the upper is so held.

33. A shoe making machine, having in combination, wipers, a gripper, means for actuating the gripper to strain the upper lengthwise of the last and hold the upper with its marginal portion under tension about the heel end of the last, and means for actuating the wipers to last the heel seat end of the shoe while the upper is so held.

34. A shoe making machine, having in combination, means for engaging an upper, operating means for relatively moving said engaging means and the last lengthwise of the upper in the direction for straining forwardly the upper placed loosely on the last and holding the upper under lengthwise tension, means for lasting the heel seat, and means for fastening the heel seat portion of the upper in lasted position.

35. A shoe making machine, having in combination, means for engaging an upper, operating means for relatively moving said engaging means and the last lengthwise of the upper in the direction for straining the upper forwardly about the heel end of the last and holding it under tension, means for working the marginal portions of the upper materials over the heel seat of the last, and means for fastening said overworked portions of the upper.

36. A shoe making machine, having in combination, means for straining an upper forwardly about the heel end of a last and holding it under tension, a heel embracing band to clamp the upper about the heel of the last, and automatically operating means for working the marginal portions of the upper materials over the heel seat of the last.

37. A shoe making machine, having in combination, means for straining an upper forwardly about the heel end of a last and holding it under tension, automatically operating means for working the marginal portions of the upper materials over the heel seat of the last, and means for fastening said overworked portions of the upper.

38. A shoe making machine, having in combination, means for straining an upper forwardly about the heel end of a last and holding it under tension, automatically operating means for working the marginal portions of the upper materials over the heel seat of the last, and automatic means for inserting a plurality of fastenings simultaneously to secure said overworked portions of the upper.

39. A shoe making machine, having in combination, means for straining an upper forwardly about the heel end of a last and holding it under tension, automatically operating means for forcing the marginal portions of the upper materials over upon the heel seat portion of the last, and power operated mechanism for relatively moving the last and said last-mentioned means in a direction for thereafter firmly pressing said material into lasted position.

40. A shoe making machine, having in combination, means for straining an upper forwardly about the heel end of a last and holding it under tension, means for forcing the marginal portions of the upper materials over upon the heel seat portion of the last and for thereafter firmly pressing said material into lasted position, and power-driven means for fastening the upper.

41. A shoe making machine, having in combination, means for pulling an upper forwardly on a last, and means arranged for operating a plurality of times automatically to wipe the upper into lasted position over the heel seat portion of the last.

42. A shoe making machine, having in combination, means for pulling an upper forwardly on a last, means arranged for operating a plurality of times automatically to wipe the upper into lasted position over the heel seat portion of the last, and means for fastening the upper.

43. A shoe making machine, having in combination, means for pulling an upper forwardly on a last, means arranged for operating a plurality of times automatically to wipe the upper into lasted position over the heel seat portion of the last, means for fastening the upper, and means for changing the relative planes of the wiping means and the shoe bottom during said wiping operations.

44. A shoe making machine having, in combination, means for pulling an upper forwardly on a last and holding it under strain out of contact with the corner formed by the bottom and end face of the toe of the last, means for clamping the upper about the heel portion of the last, and means for wiping the upper into lasted position over the heel seat of the last.

45. A shoe making machine, having in combination, means for pulling an upper forwardly on a last, means for clamping an upper about the heel portion of the last, means for wiping the upper into lasted position over the heel seat portion of the last, and means for tacking the upper.

46. A shoe making machine, having in combination, means for pulling an upper forwardly on a last, a heel embracing band, means for actuating said band forwardly and inwardly for tightening and conforming the upper materials to the last, and means for working the upper materials over upon the heel seat of the last.

47. A shoe making machine, having in combination, means for pulling an upper forwardly on a last, a heel embracing band, means for actuating said band forwardly and inwardly for tightening and conforming the upper materials to the last, and means automatically operated to wipe the upper materials repeatedly over the heel seat of the last while the last is embraced by the band.

48. A shoe making machine, having in combination, end lasting wipers constructed and arranged to wipe the entire upper over the sides and end of the heel, of the shoe simultaneously and power-driven means for repeatedly actuating said wipers.

49. A shoe making machine, having in combination, end lasting wipers constructed and arranged to wipe the entire upper over the sides and end of the heel of a shoe simultaneously, and power-driven means for repeatedly actuating said wipers, said machine having provision for changing relatively the plane of action of the wipers and the position of the shoe between successive actuations of the wipers.

50. In an end lasting machine, the combination with suitably shaped and arranged wipers and supports therefor, of means for actuating the supports substantially perpendicularly to the adjacent surfaces of the last, and sliding connections to permit the side wipers to slide through their supports lengthwise of the shoe.

51. In an end lasting machine, the combination with suitably shaped and arranged wipers, of supports for the side portions of the wipers, endwise sliding connections between said supports and the wipers, and means for actuating said supports perpendicularly to the side face of the last.

52. An end lasting machine, having in combination an end wiper and two side wipers, means for actuating the end wipers lengthwise of the shoe, connections therefrom for similarly actuating the side wipers, and means for actuating the side wipers transversely of the last having provision for permitting said lengthwise movement thereof.

53. An end lasting machine, having in combination an end wiper and two side wipers, means for actuating the end wiper lengthwise of the shoe, connections therefrom for similarly actuating the side wipers, and independently yielding means for actuating the side wipers transversely of the last.

54. An end lasting machine, having in combination, end embracing wipers, means for actuating the wipers lengthwise of the last, and independently yielding means for actuating the wipers transversely of the last.

55. An end lasting machine, having in combination, the end wiper and the two side wipers connected therewith by links.

56. An end lasting machine, having in combination, the end wiper 72, the side wipers 70, and the links 71 constructed and arranged to wipe the upper over at the corners of the last between the end and side wipers.

57. A shoe making machine, having in combination, means for supporting a shoe, heel lasting means, and automatic means for actuating the lasting means a predetermined plural number of times over the same portion of the shoe bottom to work the upper over the heel seat of the last.

58. A shoe making machine, having in combination, means for supporting a shoe, heel lasting means, automatic means for actuating the lasting means a predetermined plural number of times to work the upper over the heel seat of the last, and means for changing the relative planes of the lasting means and the shoe bottom during the said actuation.

59. A shoe making machine, having in combination, means for supporting a shoe, heel lasting means, automatic means for actuating the lasting means a predetermined plural number of times to work the upper over the heel seat of the last, and means for automatically changing the relative planes of the shoe bottom and the lasting means during said actuation.

60. A shoe making machine, having in combination, means for supporting a shoe, heel lasting means, automatic means for reciprocating the lasting means a plurality of times over the shoe bottom to work the upper into lasted position, and means for automatically moving the wipers and the last bottom relatively closer together between reciprocatory movements to condense the stock against the last bottom.

61. A shoe making machine, having in combination, means for supporting a shoe, heel lasting means, automatic means for actuating the lasting means a predetermined plural number of times to work the upper over the heel seat of the last, and means for automatically raising the shoe support between two inward strokes of the lasting means.

62. In a shoe making machine, having, in combination, means for supporting a shoe, heel lasting means, automatic means for actuating the lasting means a predetermined plural number of times to work the upper over the heel seat of the last, a bottom rest for the shoe, means for uplifting the shoe support yieldingly, and means for raising the bottom rest between reciprocating movements of the wiping means.

63. A shoe making machine, having in combination, means for supporting a shoe, heel lasting means, automatic means for actuating the lasting means a predetermined plural number of times to work the upper over the heel seat of the last, a bottom rest for the shoe, means for uplifting the shoe support yieldingly, means for locking the support against depression, and means for raising the rest to permit the shoe support to rise, said locking means operating automatically to secure the support in its raised position.

64. A shoe making machine having in combination lasting means, means for actuating the lasting means to overwork the margin of the upper and press it upon the shoe bottom, a shoe bottom rest, and means for changing the plane of the lasting means and of the shoe engaging face of the bottom rest relatively after the lasting means have advanced over the shoe bottom and before the return movement of the lasting means whereby dragging action tending to displace the overworked margin of the upper is reduced or avoided.

65. A shoe making machine having in combination lasting means, means for actuating the lasting means repeatedly during a single cycle of the machine's operation to work the upper over the shoe bottom, a shoe bottom rest and means for automatically raising the bottom rest between successive actuations of the lasting means.

66. A shoe making machine having in combination means for positioning a shoe, means for forcing an upper over the last by repeated operations on the same part of the shoe, and means for automatically raising the shoe as the overworking operation progresses.

67. A shoe making machine having in combination shoe positioning means, means for forcing the upper over the last bottom, actuating mechanism for causing the latter means to act a plurality of times upon the same portion of the shoe, and means operating automatically to change the relative planes of the last positioning means and the overworking means between successive operations of the latter.

68. A shoe making machine having in combination shoe positioning means, means operating a plurality of times on the same portion of stock for forcing the upper from the edge inwardly over the last bottom and means operating automatically to raise and lower the shoe with relation to said overworking means to vary its pressure upon the shoe.

69. A machine of the class described having in combination a working tool, actuating mechanism for causing said tool to make a plurality of complete movements over the same portion of the work during a single cycle of the machine's operation, and means for automatically changing the position of the work between movements of the tool to change the effect of the tool upon the portion of the work under treatment.

70. A shoe making machine having in combination end embracing wipers, a shoe support, tack driving mechanism, means for actuating the wipers, means for raising the shoe after the initial advance of the wipers and before the tack is driven, and means for actuating the tacking mechanism.

71. A shoe making machine having in combination wipers, a shoe support, means for actuating the wipers to break down the upper materials over the edge of the last, and means for raising the shoe, said machine having provision for automatically actuating the wipers again during the same cycle of the machine and over the same portion of the upper materials to wipe in and iron down the upper into lasted position.

72. A shoe making machine having in combination a wiper, a shoe support, tack driving mechanism, means for actuating the wipers a plurality of times during the same cycle of the machine, means for raising the shoe between actuations of the wiper, and means for actuating the tacking mechanism while the wiper holds the upper in position to be fastened.

73. A shoe making machine having in combination coöperating end lasting wipers, a shoe support, gang tacking means, and automatic actuating mechanism for said parts arranged to effect a relative movement of the last and wipers perpendicular to the plane of the last bottom during the operation of the machine.

74. A machine of the class described having, in combination, end lasting means, mechanism for moving the lasting means over a last bottom and retracting it, and means operated automatically in advance of the operation of the lasting means to level the last transversely, and again while the lasting means is over the last bottom to depress the last for relieving drag upon the upper during the return movement of the lasting means.

75. A machine of the class described having, in combination, a last support on which the last can have lateral angular positioning movement, heel lasting wipers, last positioning means constructed and arranged to engage the heel seat of the shoe at points separated laterally by a substantial distance, and means for relatively actuating said lasting wipers and the last to bring the heel seat and the wipers into substantial parallelism prior to the advance of the wipers and for further relatively actuating the wipers and the last in the direction to separate the wipers and the heel seat vertically to facilitate the retraction of the wipers.

76. A machine of the class described having, in combination, a last support on which the last can have lateral angular positioning movement, heel lasting wipers, and means arranged to engage the shoe bottom at separate points located on opposite sides of the median line of the shoe and near the edges of the innersole adjacent to the heel breast line to hold the inner-sole down in the shank during the operation of the wipers.

77. A machine of the class described having, in combination, a last support on which the last can have lateral angular positioning movement, heel lasting wipers, and means comprising relatively unyielding members arranged to engage the inner sole at opposite sides of the last near its edges to hold the innersole down upon the last bottom during the operation of the wipers.

78. A machine of the class described having, in combination, heel lasting wipers, means for automatically actuating the wipers, means for supporting the shoe arranged to permit the last to tip thereon, and means independent of the wipers serving without attention from the operator for engaging the heel seat of the shoe to tip it into position to receive the operation of the wipers.

79. A machine of the class described having, in combination, heel lasting wipers, means for automatically actuating the wipers, means for supporting the shoe arranged to permit the last to tip thereon, and means for engaging and actuating the shoe so supported to level the heel seat of the shoe transversely in advance of the action of the wipers.

80. A machine of the class described having, in combination, heel lasting wipers presenting a substantially continuous acting edge and arranged to advance and turn to overwipe the upper upon the entire heel seat at one operation, means for automatically actuating the wipers, means for supporting the shoe, and means for engaging the shoe bottom to position the shoe vertically and adapted for movement perpendicularly to the shoe bottom during the operation of the wipers.

81. A machine of the class described having, in combination, means for supporting a shoe, heel lasting wipers mounted for reciprocation in a single plane substantially parallel with the plane of the heel seat, means for automatically operating the wipers, and means for engaging the shoe bottom to position the shoe vertically and arranged for movement to cause the shoe to be positioned differently with relation to the plane of movement of the wipers during different portions of the operation of the wipers including a movement to depress the shoe and hold it down during the retraction of the wipers.

82. A machine of the class described having, in combination heel lasting wipers, means for automatically actuating the wipers, means for supporting the shoe, means for engaging the shoe bottom to position the shoe vertically, and means for automatically raising it during the operation of the wipers.

83. A lasting machine having, in combination, a shoe support, end lasting mechanism, a shoe bottom rest formed and arranged to hold the innersole in position for the upper to be lasted over it, means for moving the shoe endwise into said end lasting mechanism, and a support for the bottom rest arranged to permit said rest to accompany the shoe in the endwise movement thereof into the lasting mechanism.

84. A machine of the class described, having, in combination, a yielding shoe support, means for operating upon the shoe, means for moving the shoe into the field of operation of the operating means, a rest to engage the bottom of the shoe and positioning it vertically with relation to the operating means, a support for said rest, and a sliding connection between the rest and its support arranged to permit the shoe to be positioned vertically before it is moved backwardly and allow the rest to accompany the shoe in its backward movement.

85. A lasting machine having means for working an upper over an innersole on a last bottom, shoe supporting means movable to present the shoe to said overworking means, an innersole clamp arranged to hold the innersole down upon the last bottom adjacent to its edge to facilitate the overworking of the upper, and means for supporting the clamp arranged to permit the clamp to accompany the shoe in the movement thereof for presenting the shoe to the overworking means.

86. A shoe making machine, having in combination, power driven mechanism for operating on a shoe, a work support sustained for swinging movement from and toward the machine and for endwise vertical movement, and connections operated automatically from said power driven mechanism for uplifting the support and pulling it toward the machine.

87. A shoe making machine, having in combination, a work support sustained for swinging movement from and toward the machine and for endwise vertical movement, and connected mechanism for uplifting the support and pulling it toward the machine, and automatically operating means to lock the support against return movement in either direction.

88. A shoe making machine, having in combination, a work support sustained for swinging movement from and toward the machine and for endwise vertical movement, and independently yielding means for simultaneously uplifting and inswinging the shoe support.

89. A shoe making machine, having in combination, a work support sustained for swinging movement from and toward the machine and for endwise vertical movement, means for operating upon the shoe, power-driven means for uplifting and inswinging the support, and means for automatically locking the support against reverse movements while the machine is running and unlocking it when the machine stops.

90. A machine of the class described, having in combination, a shoe support, means for working an upper over a last, and power-driven mechanism for forcing the last inwardly toward the machine and upwardly toward the plane of the overworking means in time relation with the lasting movements of said latter means.

91. A machine of the class described, having in combination, a shoe support, a heel embracing band, and power-driven means for actuating the shoe backwardly into the band, and simultaneously actuating the sides of the band to close against the ingoing shoe.

92. A machine of the class described, having in combination, a shoe support, a heel embracing band, and power-driven means for actuating the shoe backwardly into the band, and band operating means driven by said power means and constructed and arranged to draw the end portions of the band forwardly and simultaneously close them inwardly against the ingoing shoe.

93. A machine of the class described, having in combination, a base, a jack post pivoted on the base, a shoe supporting spindle movable endwise in the post, and provided with rack teeth adjacent said pivot, a pinion located at the pivot to engage the rack teeth and means for actuating the pinion to move the spindle vertically.

94. A machine of the class described, having in combination, a base, a jack post, pivoted on the base, a shoe supporting spindle movable endwise in the post, and provided with rack teeth, a lateral rack bar connected to the jack post, a pinion arranged to engage said bar, an actuator and independently yielding connections between the actuator and the two pinions to move the shoe supporting spindle vertically and laterally.

95. In a machine of the class described, the combination with mechanism for working on a shoe, of a last supporting spindle, and means for actuating it in two directions toward said mechanism comprising the actuator 46, the cranks 44 having lost motion with relation to the actuator, the springs 45 between the cranks and the actuator, and separate connections from the cranks to the last spindle substantially as shown and described.

96. In a machine of the class described, a shoe support, an end embracing band, means for moving the shoe backwardly into the band and operatively connected means for actuating the band forwardly in frictional contact with the sides of the shoe.

97. In a machine of the class described, a shoe support, a heel embracing band, means for putting the upper under lengthwise forward tension, and means for moving the shoe backwardly into the band whereby the frictional engagement of the band with the upper assists in stretching the upper forwardly.

98. In a machine of the class described, a shoe support, a heel embracing band, means for putting the upper under lengthwise forward tension. means for moving the shoe backwardly into the band, and means for actuating the band forward in frictional contact with the upper on the sides of the heel to assist in stretching and conforming the upper to the contour of the last.

99. A machine of the class described, having in combination, means for supporting a shoe, and means for conforming the upper to the contour of the heel portion of the last, comprising a plurality of parallel independently extensible cords arranged to embrace the heel portion of the shoe.

100. A machine of the class described, having in combination, means for supporting a shoe, and means for conforming the upper to the contour of the heel portion of the last comprising a plurality of parallel independent cords arranged to embrace the heel portion of the shoe, and means for actuating said cords inwardly and forwardly.

101. A machine of the class described, having in combination, means for supporting a shoe, and means for conforming the upper to the contour of the heel portion of the last comprising a plurality of parallel, independently extensible cords arranged to embrace the heel portion of the shoe, and actuating means constructed and arranged to apply forward tension to the cords while closing them inwardly about the sides of the heel portion of the last.

102. A machine of the class described, having in combination, an end embracing band and operating devices for closing the band, including levers comprising two members which are pivotally connected and relatively yielding, said levers being constructed and arranged to project forwardly the ends thereof which are connected to the band when the band contacts with the sides of the shoe.

103. A machine of the class described, having in combination, an end embracing band and operating devices for closing the band including the levers 54 having the pivoted blocks 52 mounted to yield thereon and arranged to begin actuating the band forwardly when the band engages the work in its closing movement.

104. A machine of the class described, having in combination, an end embracing band and operating devices for closing the band arranged to close the sides of the band toward the sides of the shoe without substantial forward movement until the shoe is engaged and then to begin automatically to tension the band forwardly in contact with the upper on the sides of the last.

105. In an apparatus of the class herein described, means for conforming an upper to a last having an innersole upon its bottom face, said apparatus having provision for acting upon the innersole at its two ends to position it lengthwise.

106. In an apparatus of the class herein described, means for conforming an upper to a last, having an innersole upon its bottom face, said apparatus having provision for acting upon the innersole at its two ends to position it lengthwise and being adapted to bow the sole down into the shank of the last bottom.

107. In an apparatus of the class herein described, means for engaging the forward portion of an innersole on a last bottom, and means for putting an upper under tension about the heel portion of the last and crowding the innersole forwardly to cause it to fit down into the shank of the last.

108. In an apparatus of the class herein described, an abutment for the toe end of an innersole, and means for clamping the innersole down upon the last bottom to hold it in adjusted relation to said abutment.

109. In an apparatus of the class herein described, means for engaging the innersole on a last bottom forward of the shank of the last and adapted for movement to push the innersole backwardly, and means to effect a forward movement of the heel portion of the innersole whereby it is forced downwardly into the shank of the last.

110. In an apparatus of the class herein described, means for engaging the innersole on a last bottom forward of the shank of the last and adapted for movement to push the innersole backwardly, means to effect a forward movement of the heel portion of the innersole whereby it is forced downwardly into the shank of the last, and means for lasting the heel portion of the shoe while the innersole is so held.

111. In an apparatus of the class herein described, the rest 17 for engaging the forward portion of the innersole upon a last, the movable carrier 15 for the rest by which it may be caused to push the innersole backwardly, the stop 19, the grippers for putting the upper under forward tension about the heel portion of the last whereby the end of the innersole projecting rearwardly beyond the end face of the last is crowded forwardly while the forward portion is held by the rest 17, and operating means 28, 26 for the rest carrier and the grippers.

112. A machine of the class described having in combination, end lasting wipers and gang tacking mechanism arranged to locate the tacks inside the edges of the wipers at opposite sides of the shoe and to drive the tacks in a direction inclined inwardly whereby the ingoing tacks shall draw the upper inwardly from the opposite edges of the shoe or take up the slack that may exist between the line of tacks and the edge of the wipers.

113. A machine of the class described having means for working an upper into position to be fastened, automatically operating means for driving tacks to fasten the upper, and a device adapted to be set by the workman to prevent the driving of the tacks in a cycle of the machine's operation, said machine having provision for automatically resetting said device to permit the insertion of the tacks in the next cycle.

114. A machine of the class described having in combination, heel lasting wipers for forcing an upper over a last, a gang tacker to fasten the upper, the shouldered bar 130, arranged for movement in the tacking operation, the forked slide 140 adapted to be positioned for preventing such movement of the bar, and the hand lever 145 arranged to control the position of the slide 140 substantially as and for the purpose described.

115. A machine of the class described having in combination, mechanism for working stock into position to be fastened, mechanism for feeding and inserting fastenings, power driven means for actuating said mechanism having provision for permitting the operator to inspect the work between the stock working and fastening operations, and means controlled by the operator to prevent the driving of the fastenings during the completion of the machine's cycle if the upper is not properly overworked.

116. A machine of the class described having in combination, mechanism for working stock into position to be fastened, mechanism for feeding and inserting fastenings, power driven means for actuating said mechanisms having provision for permitting the operator to inspect the work between the stock working and fastening operations, and means controlled by the operator to prevent the driving of the fastenings during the completion of the machine's cycle if the upper is not properly overworked, and also to prevent the feeding of more fastenings until the waiting fastenings have been driven.

117. A machine of the class described having in combination, mechanism for working stock into position to be fastened, mechanism for feeding and inserting fastenings, power driven means for actuating said mechanism having provision for permitting the operator to inspect the work between the stock working and fastening operations, and means controlled by the operator to prevent the driving of the fastenings during the completion of the machine's cycle if the upper is not properly overworked, said machine having provision for automatically resetting said manually controlled means to cause the driving of the fastenings in the next cycle.

118. A machine of the class described having in combination, mechanism for working stock into position to be fastened, mechanism for driving tacks to fasten the stock, power driven means for actuating said two mechanisms, and means arranged to be manually adjusted to prevent the driving of tacks during one cycle and to be readjusted automatically to allow the driving of the tacks in the next cycle.

119. A machine of the class described, having in combination, mechanism for working stock into position to be fastened, mechanism for feeding and driving tacks to fasten the stock, power driven means for actuating said two mechanisms, and means arranged to be manually adjusted to prevent the feeding of tacks during one cycle and to be readjusted automatically to allow the feeding of the tacks in the next cycle.

120. A machine of the class described, having in combination, means for positioning stock to be fastened, means for fastening the stock, power driven mechanism for actuating said two means having provision for permitting the work to be inspected between the stock positioning and fastening operations, and means under control of the operator to delay the fastening operation and cause the positioning operation to be repeated.

121. A machine of the class described, having in combination, means for positioning stock to be fastened, means for fastening the stock, power driven mechanism for actuating said two means having provision for permitting the work to be inspected between the stock positioning and fastening operations, and means under control of the operator to delay the fastening operation until the positioning operation has been repeated, said machine having provisions for them automatically fastening the stock.

122. A lasting machine having in combination, end lasting means, upper fastening means, power driven mechanism for actuating said two means having provision for permitting the work to be inspected between the operations of the two means, and means under control of the operator to cause the lasting means to repeat its operation before the fastening operation takes place.

123. A lasting machine having in combination end lasting means, upper fastening means, power driven mechanism for actuating said two means having provision for permitting the work to be inspected between the operations of the two means, said machine having provision for causing the lasting mechanism to repeat its power driven operation before the fastening operation takes place.

124. A lasting machine having holding means for engaging the upper and lower sides of a shoe, end lasting wipers, a gang tacker and automatically operated means to actuate the wipers repeatedly and then come to rest before the tacker is operated, said machine having provision for causing at the will of the operator a further operation of the wipers before the tacker fastens the upper.

125. A lasting machine having holding means for engaging the upper and lower sides of a shoe, end lasting wipers, a tacker and automatically operated means to advance the wipers repeatedly, and then come to rest before the tacker is operated, said machine having provision for preventing the fastening of the upper in the first cycle of the machine, and repeating the cycle for further over-working and then fastening the upper while the holding means continues to maintain the shoe in operative relation to the wipers.

126. A machine of the class described, having in combination, means for gripping the forward portion of an upper to pull it forwardly on a last and hold it under lengthwise tension, a heel embracing band and means for actuating said band forwardly and inwardly for tightening and conforming the upper materials to the heel portion of the last while they are so held by the pulling means.

127. A machine of the class described, having in combination, means for gripping the forward portion of an upper and pulling it to put and hold the rear portions of the upper under lengthwise strain about the heel portion of the last while said rear portions are free to conform to the contour of the last and means for thereafter embracing the heel portion of the shoe to clamp said rear portions of the upper to the last.

128. A machine of the class described, having in combination, means for pulling a loose upper to conform it to the rear portion of a last, a flexible heel embracing band, and means to actuate it thereafter for clamping the upper to the last.

129. A machine of the class described, having in combination, grippers arranged to close upon the upper with the plane of their gripping faces substantially in the plane of the line of strain to be effected, and means for actuating the grippers angularly in a direction tending outwardly away from the last as they pull to bend the upper across the end of one of the jaws whereby the holding force of the jaws is increased with the increase in the tension applied.

130. A machine of the class described, having in combination, grippers arranged to close upon the upper with the plane of their gripping faces substantially in the plane of the line of strain to be effected, and means for actuating the jaws angularly about a fixed pivot located near the jaws and below the plane of the shoe bottom to effect the pulling strain.

131. A machine of the class described, having in combination, means for supporting a last in inverted position, grippers pivotally supported below the plane of the last bottom to grip the toe portion of the upper, means for actuating the grippers about said pivotal support to pull the upper and means engaging the toe portion of the last to hold it during the upper pulling operation.

132. A heel wiper mechanism comprising side wipers, an end wiper, means connected with said three wipers to actuate them respectively transversely and lengthwise of the last and links forming corner wipers connecting the side and end wipers and partaking of the movements of both.

133. A heel wiper mechanism comprising side wipers, an end wiper, means connected with said three wipers to actuate them respectively transversely and lengthwise of the last and links forming corner wipers connecting the side and end wipers and partaking of the movements of both, and supplemental means for actuating the links toward the corners of the heel.

134. A heel wiper mechanism comprising side wipers, an end wiper, means connected with the side wipers to actuate them transversely of the last bottom, links forming corner wipers between the end and side wipers, means connected with the end wiper for actuating all the wipers lengthwise of the shoe, and supplemental means for actuating the corner wipers obliquely transversely of the shoe.

135. An end lasting mechanism having in combination, opposed side wipers, end wiping means, intermediate corner wipers, means for actuating all the wipers lengthwise of the shoe, means for actuating the side wipers transversely of the shoe and means for actuating the corner wipers obliquely of the shoe.

136. An end lasting mechanism having in combination, opposed side wipers, an end wiper, intermediate corner wipers, means for actuating all the wipers lengthwise of the shoe, means for actuating the side wipers transversely of the shoe and means for actuating the corner wipers obliquely of the shoe, the means for actuating the several wipers being arranged to yield independently.

137. A machine of the class described, having end lasting wipers and automatically operating means for actuating the wipers over the same portion of the work repeatedly, said machine being constructed and arranged to give different characteristics to successive wiping operations over the work.

138. A machine of the class described, having end lasting wipers and means for automatically advancing the wipers repeatedly over the same portion of the shoe to do their work, said machine having provision for advancing the wipers at different speeds in successive actuations.

139. A machine of the class described, having end lasting wipers and means for automatically advancing the wipers repeatedly over the same portion of the shoe to do their work, said machine having provision for advancing the wipers in different planes automatically determined in successive actuations.

140. A machine of the class described, having end lasting wipers and means for automatically advancing the wipers repeatedly over the same portion of the work and stopping them in holding relation to the overworked upper of the shoe.

141. A machine of the class described, having end lasting wipers and means for automatically advancing the wipers and stopping them in partially retracted position to hold the upper while tacks are inserted in a portion of the upper uncovered by said partial retraction of the wipers.

142. A machine of the class described, having in combination, a wiper, a tacker and automatically operating mechanism to advance the wiper and partially retract it, said machine having provision for stopping the moving parts with the wiper holding the upper and then restarting to drive the tacks.

143. A machine of the class described, having in combination, end lasting wipers, an end embracing band, and automatically operating means to close the band and then actuate the wipers.

144. A machine of the class described, having in combination, end lasting wipers, an end embracing band, and automatically operating means to close the band and then repeatedly actuate the wipers over the shoe bottom while the band clamps the shoe.

145. A machine of the class described, having in combination, end lasting wipers, an end embracing band, and automatically operating means to close the band and then repeatedly actuate the wipers, said machine having provision for further tightening the band between actuations of the wipers.

146. A machine of the class described, having in combination, end lasting wipers, an end embracing band, and automatically operating means to close the band and then repeatedly actuate the wipers, said machine having provision for raising the shoe and the band while the wipers are being repeatedly actuated.

147. A machine of the class described, having in combination, end embracing wipers, means for automatically closing the wipers over the shoe bottom to do their work and thereafter withdrawing them, and means for automatically moving the shoe and the wipers relatively in a direction perpendicular to the last bottom to relieve the pressure of the wipers on the upper before they are withdrawn.

148. A machine of the class described, having in combination, heel embracing wipers, means for automatically closing the wipers over the shoe bottom, means for fastening the upper while it is held by the wipers, and means for automatically moving the shoe and the wipers relatively in a direction to relieve the pressure of the latter before the wipers are retracted.

149. A machine of the class described, having in combination, a wiper, a tacker and automatically operating mechanism to advance the wiper, partially retract it, insert a tack and then complete the retraction of the wiper.

150. A machine of the class described, having in combination, a wiper, a tacker and automatically operating mechanism to advance the wiper, partially retract it, insert a tack, relieve the pressure of the wiper and then complete its retraction.

151. A machine of the class described, having in combination, a wiper, a tacker and connected operating mechanism to advance the wiper, back it to uncover the tacking line while still holding the stock, insert a tack and then complete the retraction of the wiper.

152. A machine of the class described, having in combination, a wiper to force shoe upper stock into position to be fastened over the bottom of a last, and means for actuating the wiper having provision for automatically retracting the wiper through a part only of its return movement and then pausing to uncover the fastening point while the wiper continues to hold the upper.

153. A machine of the class described having in combination, a wiper to force shoe upper stock into position to be fastened over the bottom of a last, and means for advancing the wiper constructed and arranged to effect automatically a slight retraction of the wiper at the end of the forward stroke of the actuating means to permit a fastening to be inserted at a point covered by the wiper in its most advanced position.

154. A machine of the class described having in combination, end lasting wipers for closing over a last bottom, means to limit the closing of the wipers and actuating means for the wipers including means becoming operative automatically to retract the wipers partially after the limiting means has become operative.

155. A machine of the class described, having in combination, end lasting wipers, means for limiting the closing of the wipers in accordance with the size of the shoe, and actuating means for the wipers having provision for automatically backing the wipers to uncover enough of the wiped in portion of upper to receive the tacks.

156. A machine of the class described, having in combination an extensible heel band, power operated means for forcing the shoe yieldingly back into said band, and additional means for limiting the backward movement of the shoe.

157. A machine of the class described, having in combination, lasting devices, an extensible heel band, means for forcing the shoe backwardly into said band, and means in addition to said band and forcing means for limiting the movement of the shoe to determine its position with relation to the lasting devices.

158. A machine of the class described, having in combination, devices for operating on a shoe, a heel band supported to permit lateral movement, means for forcing the shoe into said band and means supplemental to the heel band constructed and arranged to center the shoe with relation to the devices for operating on the shoe.

159. A machine for working an upper over a last having, in combination, power operated means for working the margin of the upper over upon the innersole, power operated upper securing means, said two means normally and automatically operating successively on a shoe, operating mechanism therefor constructed and arranged to permit the operation of said overworking means to be repeated on the same shoe while held continuously in position for such operation, before the securing means operates, and means under control of the operator for rendering said securing means inoperative.

160. In a machine of the class described, a lasting device, a lever that is movable about its fulcrum for actuating said device, said lever being also partially rotatable about its longitudinal axis, a locking plate, and a connection between said lever and plate adapted to be actuated by said partial rotation to lock and release the lever.

161. A shoe making machine having in combination, a wiper, means for actuating the wiper over the shoe bottom inwardly from the shoe edge and means for automatically depressing the shoe before the retraction of the wiper.

162. A shoe making machine having in combination, end lasting wipers, means for advancing them to work the upper over the end portion of the last, and means operating automatically to move the wipers and the last relatively before the wipers are retracted to relieve the drag of the wipers over the upper while they are being retracted.

163. A shoe making machine having in combination, end lasting wipers, means for actuating them to do their work, shoe positioning means, and means for actuating said positioning means automatically in time relation with the backward movement of the wipers to relieve the pressure of the wipers on the upper before the wipers are retracted.

164. A shoe making machine having in combination, a wiper, a vertically movable shoe support, a hold down for the shoe, means for actuating the wiper and means for automatically actuating the hold down upwardly and then downwardly again between the initial advance of the wiper and the final retraction of the wiper.

165. A shoe making machine having in combination, a wiper, a hold down for the shoe, means for actuating the wiper and means for automatically actuating the hold down upwardly before an advance of the wipers and lowering the hold down to depress the shoe for the return movement of the wipers.

166. A machine of the class described, having in combination, means for supporting a last in inverted position, grippers, means for guiding and actuating the grippers to strain the upper lengthwise of the last in substantially right lines from the grippers to the heel, and means for lasting the heel portion of the shoe while the upper is held under such strain.

167. A lasting machine having in combination, lasting means, a back stop to position the shoe and means to adjust the back stop for shoes of different sizes including provision for indicating the correct adjustment for particular sizes.

168. A machine of the class described having in combination, heel seat lasting wipers including coöperating lasting plates and gang tacking mechanisms and a back stop adjustable to different positions for shoes of different sizes.

169. A shoe lasting mechanism having in combination, an end embracing band, devices for supporting and actuating the band to embrace a shoe, and independently yielding clamps acting through the band at a plurality of points in its length to compress the upper materials against the sides of the last.

170. A shoe lasting mechanism having, in combination, an end embracing band, and means for supporting and operating the band to embrace a shoe, including a pressure applying device at each side of the shoe formed to act upon the band near its upper edge and also at a separate point below said edge and pivoted between said edges to equalize the pressure.

171. A shoe lasting mechanism having, in combination, an end embracing band, and means for supporting and operating the band to embrace a shoe, including a pressure applying device comprising a carrier having horizontal arms swiveled on a vertical axis and a member having upper and lower pressure applying faces swiveled on each arm between said upper and lower faces for the purpose described.

172. A shoe lasting mechanism having in combination, an end embracing band, means for supporting and actuating the band to embrace the shoe, and additional means comprising swiveled clamping blocks each representing a plurality of separate contact points arranged to act through the band to assist in clamping the upper materials against the sides of the last.

173. A shoe lasting mechanism having in combination, means for supporting a shoe, end lasting devices to work the upper over the heel portion of the last, upper clamping means comprising a plurality of clamping members distributed about the heel portion of the shoe, and means for relatively actuating said members and the last to conform the upper to the side faces of the last.

174. A shoe lasting mechanism having in combination, a clamp comprising a swiveled block forked to embrace the heel end of the last and having shoe engaging members swiveled to the block and each provided with an upper and a lower contact surface, and means for relatively actuating the clamp and the shoe to compress the upper materials against the last substantially as and for the purpose described.

175. A machine of the class described having in combination, end lasting means and shoe clamping means comprising opposed arms arranged to swing toward and from the shoe, blocks swiveled on vertical axes on said arms and contact members swiveled on horizontal axes on said blocks to engage the shoe at points spaced apart lengthwise of the shoe.

176. A machine of the class described having in combination, end lasting means and shoe clamping means comprising opposed arms arranged to swing toward and from the shoe, blocks swiveled on vertical axes on said arms and contact members swiveled on horizontal axes on said blocks and having shoe engaging faces spaced apart vertically for the purpose described.

177. In a machine of the class described, a shoe clamping member comprising the swiveled block 692 having lateral converging arms, and contact members 693 swiveled in said arms on lengthwise axes and having engaging faces formed to insure contact with the upper at the upper and lower ends of said faces.

178. A machine of the class described having, in combination, means for use in assembling a shoe, including means movable lengthwise of the shoe for putting the upper under forward tension about the heel portion of the last and holding the parts of the upper in assembled relation by such tension, and means for lasting the heel seat portion of the shoe while the parts are so held.

179. A machine of the class described having, in combination, means for use in assembling a shoe, including means for gripping the forward portion of the upper and movable lengthwise of the shoe for pulling it to put the upper under forward tension about the heel end of the last and hold the parts of the shoe in assembled relation to the last by such pulling tension, and heel seat lasting mechanism arranged to operate on the shoe while the parts are so held.

180. A machine of the class described having, in combination, means for supporting a last, end embracing wipers, and automatically operated mechanism constructed and arranged to work the entire end portion of the upper into lasted position under pressure serving to compact the overworked upper upon the last bottom, and thereafter to relieve the pressure and subsequently to withdraw the wipers, all in a single operation of the machine.

181. A machine of the class described having, in combination, means for supporting a shoe, end embracing wipers adapted to work the upper into lasted position over the entire heel seat of the shoe at one operation of the machine, tacking mechanism, and power operated mechanism to move the wipers forwardly and backwardly over the same portion of the shoe and bring the wipers automatically to rest in a position to hold the overwiped upper while the upper is being fastened by the tacking mechanism and thereafter to operate the tacking mechanism.

182. A machine of the class described having, in combination, means for supporting a shoe, end lasting wipers, and power driven means constructed and arranged to reciprocate the end lasting wipers over the same portions of the shoe bottom repeatedly.

183. A machine of the class described having, in combination, means for supporting a shoe, end lasting wipers, and power driven means constructed and arranged to reciprocate the end lasting wipers over the same portion of the shoe bottom a predetermined plural number of times.

184. A machine of the class described having, in combination, means for supporting a shoe, end lasting wipers, and power operated mechanism constructed and arranged to reciprocate the wipers over the shoe bottom and to bring the wipers to rest automatically in a partially retracted position to permit the shoe upper to be fastened while it is held by the partially retracted wipers.

185. A machine of the class described having, in combination, means for supporting a shoe, end lasting mechanism including end embracing wipers, power operated mechanism constructed and arranged to cause the wipers to force the margin of the entire end portion of the upper into lasted position over the shoe bottom and then partially to retract the wipers and automatically bring the wipers to rest in a predetermined position holding the upper to permit it to be fastened, and means for fastening the upper inside the edges of the partially retracted wipers while the lasting mechanism holds the upper.

186. A machine of the class described having, in combination, means for supporting a shoe, end lasting wipers constructed and arranged to work the upper into lasted position over the entire end portion of the shoe at a single operation, a gang tacker, and connected mechanism to actuate said lasting and tacking instrumentalities to last and tack an end portion of a shoe at a single operation.

187. A machine of the class described having, in combination, means for supporting a shoe, heel lasting mechanism constructed and arranged to work the upper into lasted position over the entire heel seat portion of the shoe at a single operation, automatic operating mechanism therefor having provision for stopping at a predetermined point in its cycle for holding the upper in lasted position while it is tacked, and means for tacking the upper while it is so held.

188. A machine of the class described having, in combination, last supporting means, heel lasting wipers, and automatically operating mechanism to advance the wipers repeatedly and to raise the last support while the wipers are at one end of their movement.

189. A machine of the class described having, in combination, last supporting means, heel lasting wipers constructed and arranged to work an upper into lasted position over the entire heel seat portion of the shoe at a single operation and having stock shoe flattening faces extending substantially continuously around the heel seat, and power operated mechanism to advance and retract the wipers and positively to effect a relative movement of the wipers and the last perpendicularly to the plane of said stock flattening faces to relieve the drag of the wipers during their retracting movement.

190. A machine of the class described having, in combination, a heel embracing band, heel lasting wipers, and power driven means to actuate said band and wipers in time relation to seize a shoe, shape the upper materials to the heel portion of the last, come to rest to permit the upper to be fastened and, when restarted, to relieve the shaping pressure and then return to shoe receiving relation.

191. A machine of the class described having, in combination, a heel embracing band, heel lasting wipers, and automatic operating means to close the band, repeatedly actuate the wipers, and then open the band.

192. A machine of the class described having, in combination, a heel embracing band, heel lasting wipers, and automatic operating means to close the band, actuate the wipers, tighten the band, and repeat the actuation of the wipers.

193. A machine of the class described having, in combination, a heel embracing band, heel lasting wipers, and automatic operating means to close the band, actuate the wipers, change the relative planes of the shoe bottom and the wipers, tighten the band, and repeat the actuation of the wipers.

194. A machine of the class described having, in combination, a heel embracing band, heel lasting wipers, and automatic operating means to close the band, advance and retract the wipers, and open the band, said machine having provision for relatively moving the wipers and the shoe vertically while the band is closed.

195. A machine of the class described having, in combination, automatically actuated end lasting wipers, and automatically actuated tacking devices operatively connected therewith.

196. A machine of the class described having, in combination, automatically actuated end lasting wipers, and a gang tacker operated automatically in time relation with the wipers.

197. A machine of the class described having, in combination, means to pull an upper forwardly on a last and hold it under tension, operating devices to move said pulling means lengthwise of the last for stretching the upper and controlling its position during the heel seat lasting operation, and means for lasting the heel portion of the shoe while the upper is so held.

198. A machine of the class described having, in combination, means movable lengthwise of a last to pull an upper forwardly on the last and hold it under tension, and means operated automatically for lasting the heel portion of the shoe while the upper is so held.

199. A machine of the class described having, in combination, means engaging the forepart of an upper and movable lengthwise of a last to put the upper under forward tension about the heel portion of the last, additional means to clamp the upper about the heel portion of the last, and means for forcing the upper into lasted position upon the heel seat.

200. A machine of the class described having, in combination, means to put an upper under forward tension about the heel portion of the last, additional means to clamp the upper about the heel portion of the last, means for lasting the heel, and means for tacking the shoe to hold the upper.

201. A machine of the class described having, in combination, means to put an upper under forward tension about the heel portion of a last, and power driven mechanisms for overwiping and tacking the upper at the heel seat while it is so held under tension.

202. A machine of the class described, having, in combination, means for adjusting relatively an upper, a heel stiffener and an innersole into assembled relation and for working said parts into lasted relation over the heel part of the last, and means for securing the parts together over the portion lasted.

203. A machine of the class described, having, in combination, means for adjusting relatively an upper, a heel stiffener and an innersole into assembled relation and for automatically working said parts into lasted relation over the heel part of the last, and means for securing the parts together over the portion lasted.

204. A machine of the class described, having, in combination, means for adjusting relatively an upper, a heel stiffener and an innersole into assembled relation and for automatically working said parts into lasted relation over the heel part of the last, and means for automatically securing the parts together over the portion lasted.

205. A machine for operating upon parts of a shoe arranged upon a last, having, in combination, means for moving an innersole rearwardly upon a last, means for pressing a heel stiffener against the end and sides of the last, and means for securing the sides of the stiffener to the innersole.

206. A machine of the class described, having, in combination, automatic means for pressing a heel stiffener against the opposite sides of a last simultaneously, and an automatic means for thereafter securing the sides of the stiffener to an innersole carried by the last.

207. A machine of the class described, having, in combination, means for pressing a heel stiffener against the opposite sides of a last simultaneously, means for thereafter securing the sides of the stiffener to an innersole carried by the last, and means for bringing successively into operation said pressing means and securing means.

208. A gang heel seat fastening machine having, in combination, a gang of tackers, a shoe support, an end embracing band, and power mechanism for drawing the shoe support into the band and raising it to the working position and then coming automatically to rest, and means operating in time relation when the machine is restarted to compress the stock upon the last bottom and then effect insertion of the tacks.

209. A gang heel seat fastening machine having, in combination, a gang of tackers, a shoe support, end lasting means, and power mechanism for drawing the shoe support into the end lasting means and raising it to the working position and for actuating the tackers.

210. An end lasting mechanism having, in combination with suitable operating mechanism, heel embracing wipers comprising at each side of the heel three members connected for pivotal movement relatively, and means for directing such relative movement.

211. An end lasting mechanism having, in combination with suitable operating mechanism, heel embracing wipers comprising at each side of the heel rear end, corner and side members connected together for relative pivotal movement and means for directing each member in a path differing from that of the others and adapted to the portion of the heel edge across which it is to operate.

212. An automatic heel seat laster having, in combination, a last support, heel embracing wipers for engaging and wiping over simultaneously the upstanding portions of the upper at both sides of the heel portion of the shoe, power operating mechanism for the wipers, guiding means for confining the wipers to movement in a single plane, means engaging the shoe bottom and determining its height relative to the plane of the wipers, a last support to uphold the shoe, and operating means to press the shoe up against the bottom engaging means and which is movable during the power operation of the machine to change the vertical relation of the shoe to the wipers.

213. An automatic end lasting machine having, in combination, end lasting wipers, guiding means for the wipers, power operating mechanism for advancing and closing the wipers a plurality of times over the same portion of the upper in lasting a single shoe, and means for changing the vertical position of the shoe with relation to the wipers between one advance of the wipers and their next automatically effected advance over the shoe bottom.

214. A heel seat forming machine having, in combination, a shoe support comprising a heel seat inside shaping member, end embracing wipers movable thereover to shape the flange of the upper, and power mechanism for operating said wipers to shape the flange and operating to release the shaping pressure prior to the retraction of the wipers to relieve outward drag on the shaped flange.

215. A shoemaking machine having, in combination, heel seat forming means including an inside former, heel embracing wipers, means for relatively moving the wipers and the former to turn the margin of an upper inwardly upon the heel seat face of the former and shape it under pressure and to return to starting position, and means for relatively moving the wipers and the former substantially perpendicularly to the plane of the heel seat face of the former prior to said return movement to prevent outward drag on the upper.

216. A machine of the class described having, in combination, a shoe holder and devices for maintaining the shoe stock in condition for the operation of tackers thereon, a plurality of tackers, power operated means for relatively moving the tackers and the shoe holder into position for the tackers to insert the tacks, and means controlled by the operator for modifying the normal sequence of the operations and causing the power means to complete its cycle without driving the tacks and while said holder and devices retain their control of the shoe stock.

217. In a machine of the class described, shoe holding means including means for maintaining the shoe upper in position for fastening, upper securing devices, and power operated means therefor; and controlling means arranged for manual operation to determine for each shoe, after the operation of the machine has been commenced, whether the upper shall be secured or the machine shall be permitted to repeat its cycle upon the shoe so held by the first-mentioned means before the upper is secured.

218. A heel seat lasting machine having, in combination, a gage to position the toe end of an innersole flush with the toe end of the last, means to position the heel end of the innersole flush with the heel end of the last, means to bow the innersole down into the shank of the last and clamp the heel seat portion of the innersole down upon the last bottom at opposite sides near the breast line, and a plurality of fastening applying devices movable inwardly over the heel seat in converging lines and operating to fasten the upper along the margin of the heel seat.

219. A machine of the class described having, in combination, a gage to position the toe end of an innersole flush with the toe end of a last, means to position the heel end of the innersole flush with the heel end of the last, means to bow the innersole down into the shank of the last, and means for fastening the shoe upper to the heel seat portion of the innersole.

220. A machine of the class described having, in combination, means for operating on a shoe, and means for positioning the shoe comprising a heel pin, a spring arranged to rock the heel pin in the direction for tipping the toe end of the shoe upwardly, and a rest to engage the bottom face of the last to limit said movement of the toe end of the shoe and locate the bottom face of the last for the action of said operating means upon the shoe.

221. A machine of the class described having, in combination, means for supporting a shoe, and a gripper operatively connected with the shoe support and arranged in position to engage the forepart of the shoe upper and stretch the upper lengthwise of the last, said toe gripper being adjustable in a vertical path to compensate for differences in the angular relation of the plane of the heel seat of the last to the plane of the forepart of the last and effect proper drafting of the upper.

222. A machine of the class described having, in combination, a last support, a mold comprising coöperating jaws, heel seat wipers, and connected mechanism for actuating the jaws to clamp the upper materials against the side faces of the last with molding pressure and to actuate the support and wipers to compress the heel seat and come to rest with the shoe under pressure in the mold.

In testimony whereof I have signed my name to this specification in the presence of two subscribing witnesses.

RONALD F. McFEELY.

Witnesses:
CHARLES H. HOYT,
LEONARD M. JOHNSON.

It is hereby certified that in Letters Patent No. 1,129,881, granted March 2, 1915, upon the application of Ronald F. McFeely, of Beverly, Massachusetts, for an improvement in "Machines for Use in the Manufacture of Boots and Shoes," errors appear in the printed specification requiring correction as follows: Page 5, line 31, for the word "blocks" read *block;* page 6, line 89, for the word "rigid" read *right;* page 12, line 83, strike out the word "In" first occurrence and make the article "a" a capital letter; page 20, lines 55–56, for the word "representing" read *presenting;* and that the said Letters Patent should be read with these corrections therein that the same may conform to the record of the case in the Patent Office.

Signed and sealed this 21st day of September, A. D., 1915.

[SEAL.]
J. T. NEWTON,
*Acting Commissioner of Patents.*